United States Patent
Kishi

(10) Patent No.: US 10,641,384 B2
(45) Date of Patent: May 5, 2020

(54) TRANSMISSION CONTROL METHOD AND TRANSMISSION CONTROL DEVICE FOR CONTINUOUSLY VARIABLE TRANSMISSION

(71) Applicant: Nissan Motor Co., Ltd., Yokohama-shi, Kanagawa (JP)

(72) Inventor: Daigo Kishi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/333,257

(22) PCT Filed: Sep. 16, 2016

(86) PCT No.: PCT/JP2016/077383
§ 371 (c)(1),
(2) Date: Mar. 14, 2019

(87) PCT Pub. No.: WO2018/051481
PCT Pub. Date: Mar. 22, 2018

(65) Prior Publication Data
US 2019/0249768 A1    Aug. 15, 2019

(51) Int. Cl.
*F16H 61/66*   (2006.01)
*F16H 61/02*   (2006.01)
(Continued)

(52) U.S. Cl.
CPC ......... *F16H 61/0213* (2013.01); *F16H 61/02* (2013.01); *F16H 61/66* (2013.01);
(Continued)

(58) Field of Classification Search
CPC ...... F16H 61/02; F16H 61/0213; F16H 61/66; F16H 61/662; F16H 2061/66204; F16H 2061/6615; F16H 2061/0227
See application file for complete search history.

(56) References Cited

U.S. PATENT DOCUMENTS 5,947,861 A * 9/1999 Nobumoto .......... F16H 61/6648
477/37
2013/0244833 A1* 9/2013 Takamura .......... B60W 10/101
477/115
(Continued)

FOREIGN PATENT DOCUMENTS

CN    101484733 A    7/2009
CN    105452734 A    3/2016
(Continued)

*Primary Examiner* — Edwin A Young
(74) *Attorney, Agent, or Firm* — Global IP Counselors, LLP

(57) ABSTRACT

A transmission control method has a normal stepless manner transmission mode and a pseudo-stepped downshift mode for controlling a continuously variable transmission connected to an input side of an engine. A downshift target rotational speed and a lower-limit target rotational speed used for the pseudo-stepped downshift are set to values in an engine rotational speed region in which an engine output becomes greater than or equal to a prescribed value. When a mode transition condition is satisfied during deceleration by selecting the normal transmission mode, the mode is shifted to the pseudo-stepped downshift mode to start the pseudo-stepped downshift. When the pseudo-stepped downshift is initiated, an increase to the downshift target rotational speed and a decrease to the lower-limit target rotational speed of the primary rotational speed are repeated, until the mode cancellation condition, including the re-acceleration request, is satisfied.

12 Claims, 8 Drawing Sheets

(51) Int. Cl.
   *F16H 61/662*   (2006.01)
   *F16H 59/44*    (2006.01)
   *F16H 59/48*    (2006.01)
   *F16H 59/36*    (2006.01)

(52) U.S. Cl.
   CPC ........... *F16H 61/662* (2013.01); *F16H 59/44* (2013.01); *F16H 59/48* (2013.01); *F16H 2059/366* (2013.01); *F16H 2061/0227* (2013.01); *F16H 2061/6612* (2013.01); *F16H 2061/6615* (2013.01)

(56) References Cited

U.S. PATENT DOCUMENTS

| | | | | |
|---|---|---|---|---|
| 2014/0342860 | A1* | 11/2014 | Suzuki | F16H 61/02 474/28 |
| 2015/0045183 | A1* | 2/2015 | Aichi | F16H 59/18 477/37 |
| 2015/0345630 | A1* | 12/2015 | Wang | F16H 9/16 474/11 |

FOREIGN PATENT DOCUMENTS

| | | | |
|---|---|---|---|
| JP | 2005-42871 | A | 2/2005 |
| JP | 2010-7749 | A | 1/2010 |
| JP | 2014-214824 | A | 11/2014 |
| JP | 2015-197203 | A | 11/2015 |

* cited by examiner

TRANSMISSION CONTROL METHOD AND TRANSMISSION CONTROL DEVICE FOR CONTINUOUSLY VARIABLE TRANSMISSION

CROSS-REFERENCE TO RELATED APPLICATIONS

This application is a U.S. national stage application of International Application No. PCT/JP2016/077383, filed on Sep. 16, 2016.

BACKGROUND

Technical Field

The present invention relates to a transmission control method and a transmission control device for a continuously variable transmission that has, as shifting modes of the continuously variable transmission, a normal transmission mode and a pseudo-stepped transmission mode.

Background Information

A transmission control device for a continuously variable transmission is conventionally known, in which, during travel, a control is carried out to select between, as shifting mode, a normal transmission mode for changing the transmission ratio in a stepless manner, and a pseudo-stepped upshift mode for changing the transmission ratio to a high gear side in a stepwise manner (for example, see Japanese Laid-Open Patent Application No. 2010-007749 referred to herein as Patent Document 1).

SUMMARY

However, in the conventional device, only a pseudo-stepped upshift mode during acceleration is disclosed as a pseudo-stepped transmission mode, and only how to carry out a pseudo-stepped upshift is considered. That is, Patent Document 1 does not disclose a pseudo-stepped downshift mode during deceleration, and how to carry out a pseudo-stepped downshift is not at all considered; thus, there is room for consideration.

In view of the problem described above, an object of the present invention is to achieve an improvement in acceleration response with respect to a re-acceleration request, while improving the feeling of deceleration during deceleration by selecting the pseudo-stepped downshift mode.

In order to achieve the object described above, the present invention is a transmission control method for a continuously variable transmission having a pseudo-stepped downshift mode, in which a transmission input rotational speed is increased to a downshift target rotational speed in a stepwise manner, and then decreased toward a lower-limit target rotational speed as the vehicle speed decreases. The downshift target rotational speed and the lower-limit target rotational speed used for the pseudo-stepped downshift are set to values in an engine rotational speed region in which engine output becomes greater than or equal to a prescribed value. When a mode transition condition is satisfied during deceleration by selecting the normal transmission mode, the mode is shifted to the pseudo-stepped downshift mode to start the pseudo-stepped downshift. When the pseudo-stepped downshift is initiated, an increase to the downshift target rotational speed and a decrease to the lower-limit target rotational speed of the transmission input rotational speed are repeated until a mode cancellation condition, including a re-acceleration request, is satisfied.

In this manner, by simulating the pseudo-stepped downshift using the rotational speed region in which the engine output becomes high during deceleration by selecting the pseudo-stepped downshift mode, it is possible to achieve an improvement in acceleration response with respect to a re-acceleration request, while improving the feeling of deceleration.

DETAILED DESCRIPTION OF THE EMBODIMENTS

Figure 1:
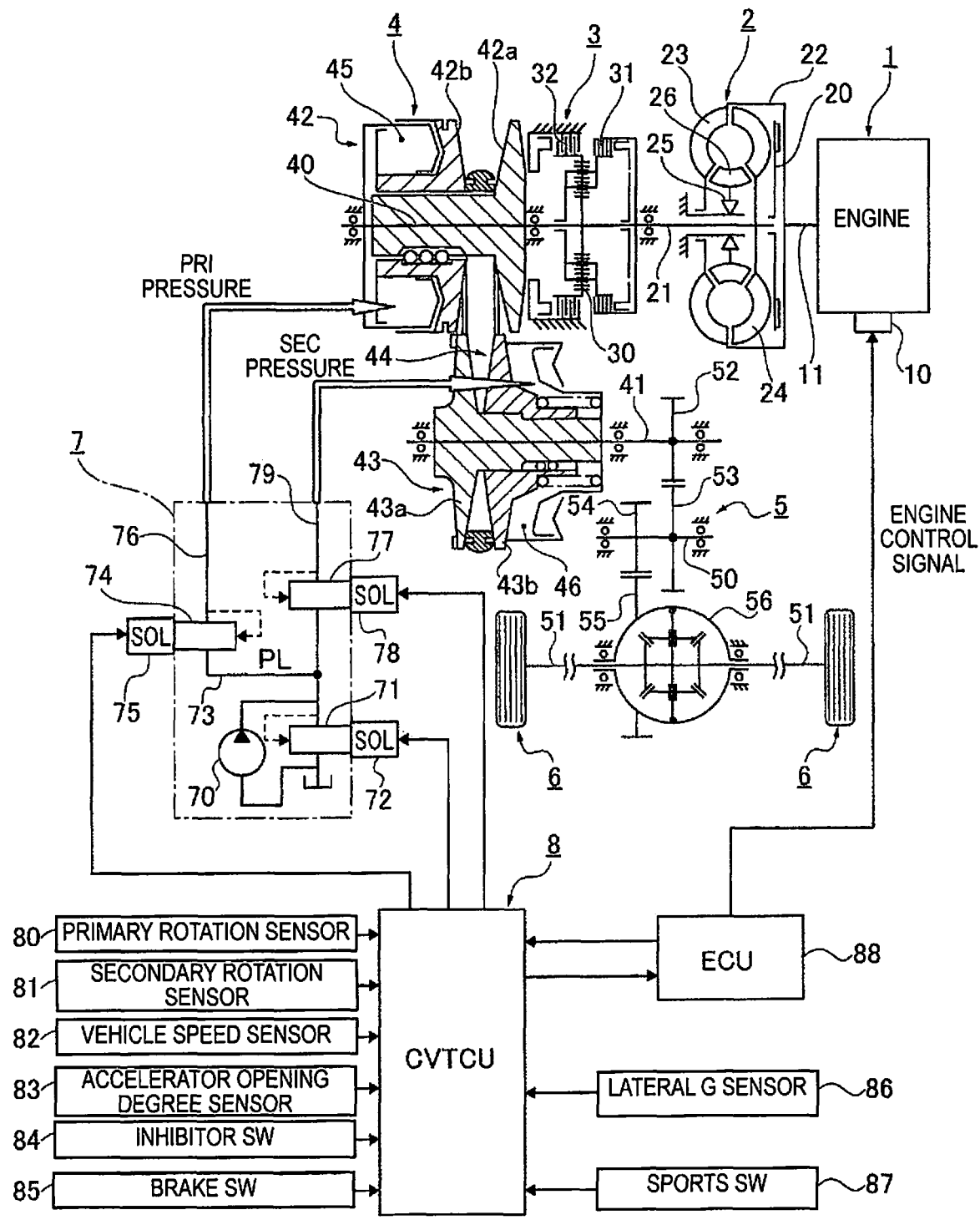
FIG. 1 is an overall system view illustrating a drive system and a control system of a vehicle equipped with a belt-type continuously variable transmission to which is applied a control device according to a first embodiment.

A preferred embodiment for achieving the transmission control method and the transmission control device for a continuously variable transmission according to the present invention will be described below based on a first embodiment and a second embodiment illustrated in the drawings.

First Embodiment

The configuration is described first. The transmission control method and the transmission control device in the first embodiment are applied to an engine-powered vehicle equipped with a belt-type continuously variable transmission. An "overall system configuration," a "configuration of the mode transition control process," and a "configuration of a process for setting a target rotational speed used in the pseudo-stepped downshift" will be described separately below, regarding the configuration of the first embodiment.

Overall System Configuration

Figure 2:
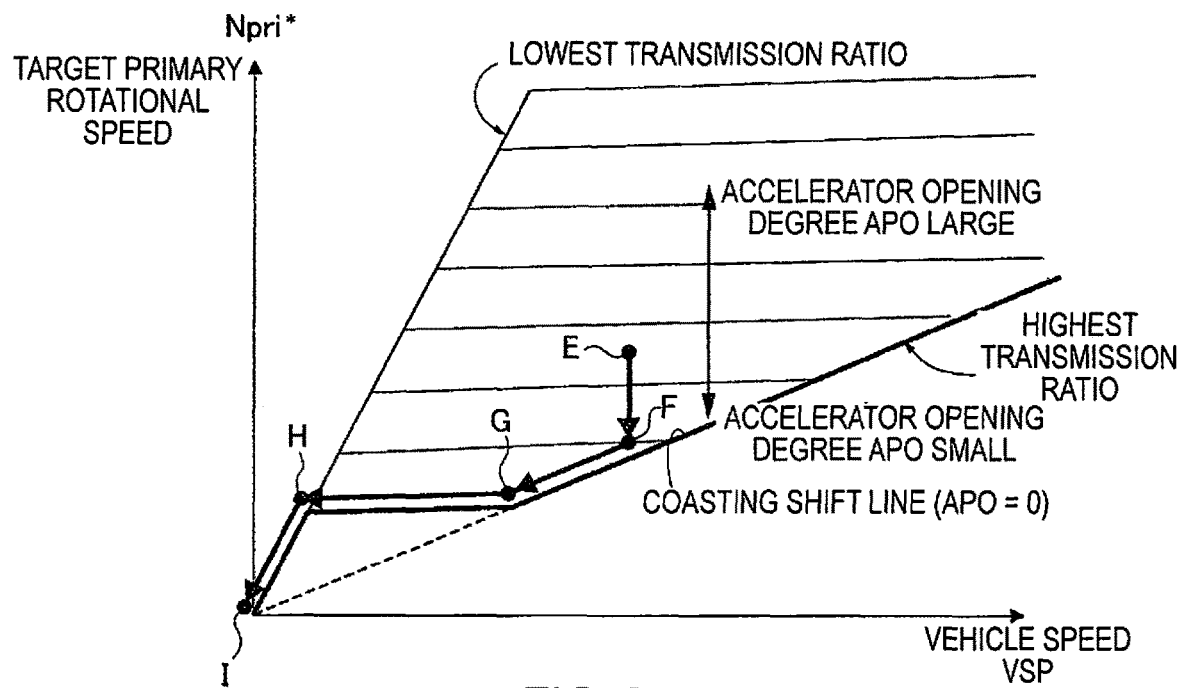
FIG. 2 is a shift schedule diagram illustrating a shift schedule that is used when a normal transmission mode is selected upon executing a shift control in a CVT control unit according to the first embodiment.
Figure 3:
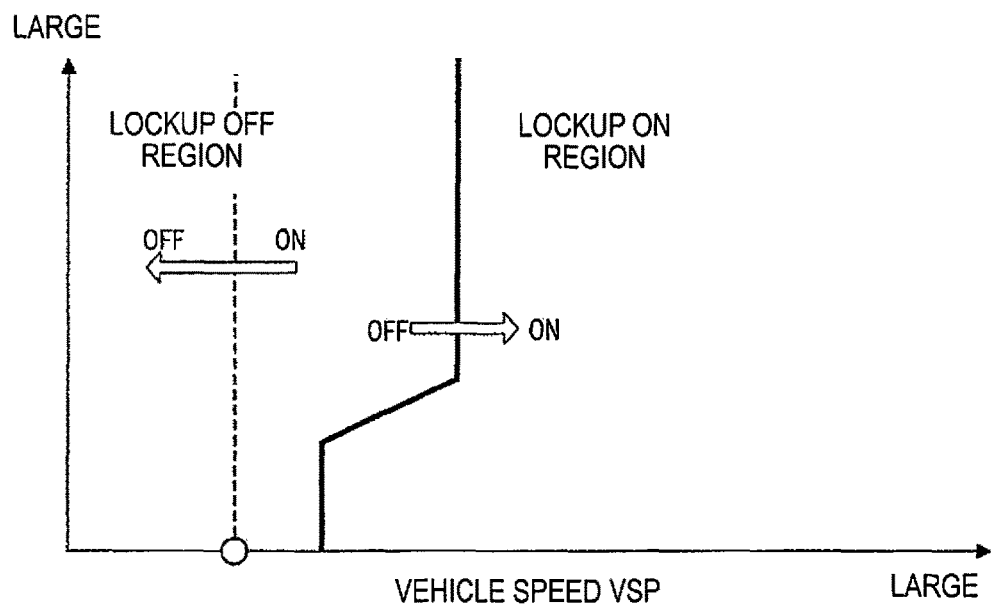
FIG. 3 is a smooth LU schedule diagram illustrating one example of a smooth LU schedule that is used when executing a lockup control in the CVT control unit according to the first embodiment.

FIG. 1 illustrates a drive system and a control system of a vehicle equipped with a belt-type continuously variable transmission, to which is applied the transmission control method and the transmission control device according to the first embodiment; FIG. 2 illustrates a shift schedule used when a normal transmission mode is selected; and FIG. 3 illustrates a smooth LU schedule of a lockup clutch. The overall system configuration will be described below with reference to FIGS. 1 to 3.

The drive system of the vehicle equipped with the belt-type continuously variable transmission comprises an engine 1, a torque converter 2, a forward/reverse switching mechanism 3, a belt-type continuously variable transmission mechanism 4 (continuously variable transmission), a final reduction gear mechanism 5, and drive wheels 6, 6, as illustrated in FIG. 1. The belt-type continuously variable transmission is configured as a unit, in which the torque converter 2, the forward/reverse switching mechanism 3, the belt-type continuously variable transmission mechanism 4, and the final reduction gear mechanism 5 are housed in a transmission case.

It is possible to control an output torque of the engine 1 by use of an external engine control signal, in addition to controlling the output torque by use of an accelerator operation by a driver, as illustrated in FIG. 1. This engine 1 includes an output torque control actuator 10 that controls the output torque by use of an opening/closing operation of a throttle valve, a fuel cut operation, or the like.

The torque converter 2 is a starting element that has a torque increasing function, and comprises a lockup clutch 20 that can directly couple an engine output shaft 11 (=torque converter input shaft) and a torque converter output shaft 21 when the torque increasing function is not needed, as illustrated in FIG. 1. The constituent elements of the torque converter 2 include a turbine runner 23 that is connected to the engine output shaft 11 via a converter housing 22, a pump impeller 24 that is connected to the torque converter output shaft 21, and a stator 26 provided on the case via a one-way clutch 25.

The forward/reverse switching mechanism 3 is for switching the input rotational direction to the belt-type continuously variable transmission mechanism 4 between a forward rotation direction during forward travel and a reverse rotation direction during backward travel, as illustrated in FIG. 1. This forward/reverse switching mechanism 3 comprises a double pinion type planetary gear 30, a forward clutch 31, and a reverse brake 32.

The belt-type continuously variable transmission mechanism 4 has a continuously variable transmission function for changing, in a stepless manner, the transmission ratio, which is the ratio between an input rotational speed of a transmission input shaft 40 and an output rotational speed of a transmission output shaft 41, by changing the contact diameter of the belt, and comprises a primary pulley 42, a secondary pulley 43, and a belt 44, as illustrated in FIG. 1. The primary pulley 42 is composed of a fixed pulley 42a and a slide pulley 42b, and the slide pulley 42b is slid by use of a primary hydraulic pressure that is guided to a primary hydraulic pressure chamber 45, as illustrated in FIG. 2. The secondary pulley 43 is composed of a fixed pulley 43a and a slide pulley 43b, and the slide pulley 43b is slid by use of the primary hydraulic pressure that is guided to a secondary hydraulic pressure chamber 46, as illustrated in FIG. 2. The belt 44 is wound around V-shaped sheave surfaces 42c, 42d of the primary pulley 42, and V-shaped sheave surfaces 43c, 43d of the secondary pulley 43.

The final reduction gear mechanism 5 is for decelerating and transmitting the transmission output rotation from the transmission output shaft 41 of the belt-type continuously variable transmission mechanism 4 to the left and right drive wheels 6, 6 after providing a differential function thereto, as illustrated in FIG. 1. This final reduction gear mechanism 5 is interposed between the transmission output shaft 41, an idler shaft 50, and left and right drive shafts 51, 51, and includes a first gear 52, a second gear 53, a third gear 54, and a fourth gear 55, which have a deceleration function, and a differential gear 56, which has a differential function.

The control system of the vehicle equipped with the belt-type continuously variable transmission comprises a shifting hydraulic pressure control unit 7 (shifting hydraulic pressure control system) and a CVT control unit 8 (electronic control system), as illustrated in FIG. 1.

The shifting hydraulic pressure control unit 7 is a hydraulic pressure control unit based on a double pressure regulation method, which creates a primary hydraulic pressure Ppri, which is guided to the primary hydraulic pressure chamber 45, and a secondary hydraulic pressure Psec, which is guided to the secondary hydraulic pressure chamber 46. The shifting hydraulic pressure control unit 7 comprises an oil pump 70, a regulator valve 71, a line pressure solenoid 72, and a line pressure oil passage 73. The shifting hydraulic pressure control unit further comprises a first pressure regulating valve 74, a primary hydraulic pressure solenoid 75, a primary pressure oil passage 76, a second pressure regulating valve 77, a secondary hydraulic pressure solenoid 78, and a secondary pressure oil passage 79.

The regulator valve 71 is a valve for regulating line pressure PL by using a discharge pressure from the oil pump 70 as the source pressure. The first pressure regulating valve 74 uses the line pressure PL created by the regulator valve 71 as the source pressure and creates the primary hydraulic pressure Ppri to be guided to the primary hydraulic pressure chamber 45. The second pressure regulating valve 77 uses the line pressure PL created by the regulator valve 71 as the source pressure and creates the secondary hydraulic pressure Psec to be guided to the secondary hydraulic pressure chamber 46.

The CVT control unit 8 carries out line pressure control, shift control, forward/reverse switching control, lockup control, and the like. In the line pressure control, a control command for obtaining a target line pressure corresponding to a throttle opening degree is output to the line pressure solenoid 72. In the shift control, a control command for obtaining a target primary rotational speed Ppri* (=target transmission ratio) corresponding to a vehicle speed VSP, a throttle opening degree APO, or the like, is output to the primary hydraulic pressure solenoid 75 and the secondary hydraulic pressure solenoid 78. In the forward/reverse switching control, the engagement and disengagement of the forward clutch 31 and the reverse brake 32 are controlled. In the lockup control, the engagement and disengagement of the lockup clutch 20 are controlled.

Sensor information and switch information from a primary rotation sensor 80, a secondary rotation sensor 81, a vehicle speed sensor 82, an accelerator opening degree sensor 83, an inhibitor switch 84, a brake switch 85, a lateral G sensor 86, a sports switch 87, and the like are input to the CVT control unit 8. In addition, engine rotational speed information and torque information are input from an engine control unit 88, and a torque request, and the like, are output to the engine control unit 88.

The shift control of the belt-type continuously variable transmission mechanism 4 and the lockup control of the lockup clutch 20 will be described below.

The shift control at the time the normal transmission mode is selected is carried out by determining the target primary rotational speed Npri* from an operating point (VSP, APO) on the shift schedule, using the shift schedule shown in FIG. 2 and the operating point specified by the vehicle speed VSP and the accelerator opening degree APO. In the shift schedule for obtaining an actual stepless transmission ratio, the transmission ratio is changed within a range of a transmission ratio width defined by a lowest transmission ratio and a highest transmission ratio, in accordance with the operating point (VSP, APO), as illustrated in FIG. 2. For example, when the vehicle speed VSP is constant, if an accelerator depression operation is carried out, the target primary rotational speed Npri* increases and shifts in a downshift direction, and if an accelerator depression returning operation is carried out, the target primary rotational speed Npri* decreases and shifts in the upshift direction. If the vehicle speed VSP increases when the accelerator opening degree APO is constant, the gear is shifted in the upshift direction, and if the vehicle speed VSP decreases, the gear is shifted in the downshift direction. The thick line characteristic in FIG. 2 is a coasting shift line in the accelerator foot release state (APO=0).

When the target primary rotational speed Npri* is determined, the shift control is carried out by subjecting a pressure difference between the primary hydraulic pressure Ppri and the secondary hydraulic pressure Psec to feedback control so as to eliminate the deviation from the primary rotational speed Npri from the primary rotation sensor 80. For example, if the target primary rotational speed Npri* becomes higher than the current primary rotational speed Npri, a control is carried out in the downshift direction from the transmission ratio at that time, that is, a differential pressure control is carried out in which the pressure difference between the secondary hydraulic pressure Psec and the primary hydraulic pressure Ppri is increased. If the target primary rotational speed Npri* becomes lower than the current primary rotational speed Npri, a control is carried out in the upshift direction from the transmission ratio at that time, that is, a differential pressure control is carried out in which the pressure difference between the primary hydraulic pressure Ppri and the secondary hydraulic pressure Psec is increased.

The lockup control of the lockup clutch 20 is carried out by determining LU engagement and LU disengagement from the operating point (VSP, APO) on a smooth LU schedule, using the smooth LU schedule shown in FIG. 3 and the operating point specified by the vehicle speed VSP and the accelerator opening degree APO. The smooth LU schedule includes an LU engagement line (solid line: for example, about 20 km/h) and an LU disengagement line (broken line: for example, about 10 km/h), as illustrated in FIG. 3. In the lockup control, an engagement command is output when the operating point (VSP, APO) crosses the LU engagement line from a lockup OFF region and enters a lockup ON region. A disengagement command is output when the operating point (VSP, APO) crosses the LU disengagement line from the lockup ON region and enters the lockup OFF region.

Here, when disengaging the lockup clutch 3, the LU disengagement line of FIG. 3 is used when in a drive state (APO>0) due to an accelerator depression, and is not used when in a coasting state (APO=0) with the foot off the accelerator. That is, during coasting LU, instead of the LU disengagement line of FIG. 3, a lockup release control is initiated when the detected vehicle speed falls below, for example, a predicted vehicle speed of a lockup release timing (lower vehicle speed than the LU disengagement line of FIG. 3). In other words, in the shift control when a normal transmission mode or a pseudo-stepped downshift mode, described further below, are selected, the lockup clutch 3 is engaged, and the engine rotational speed Ne of the engine 1 coincides with the primary rotational speed Npri of the belt-type continuously variable transmission mechanism 4.

Configuration of the Mode Transition Control Process

Figure 4:
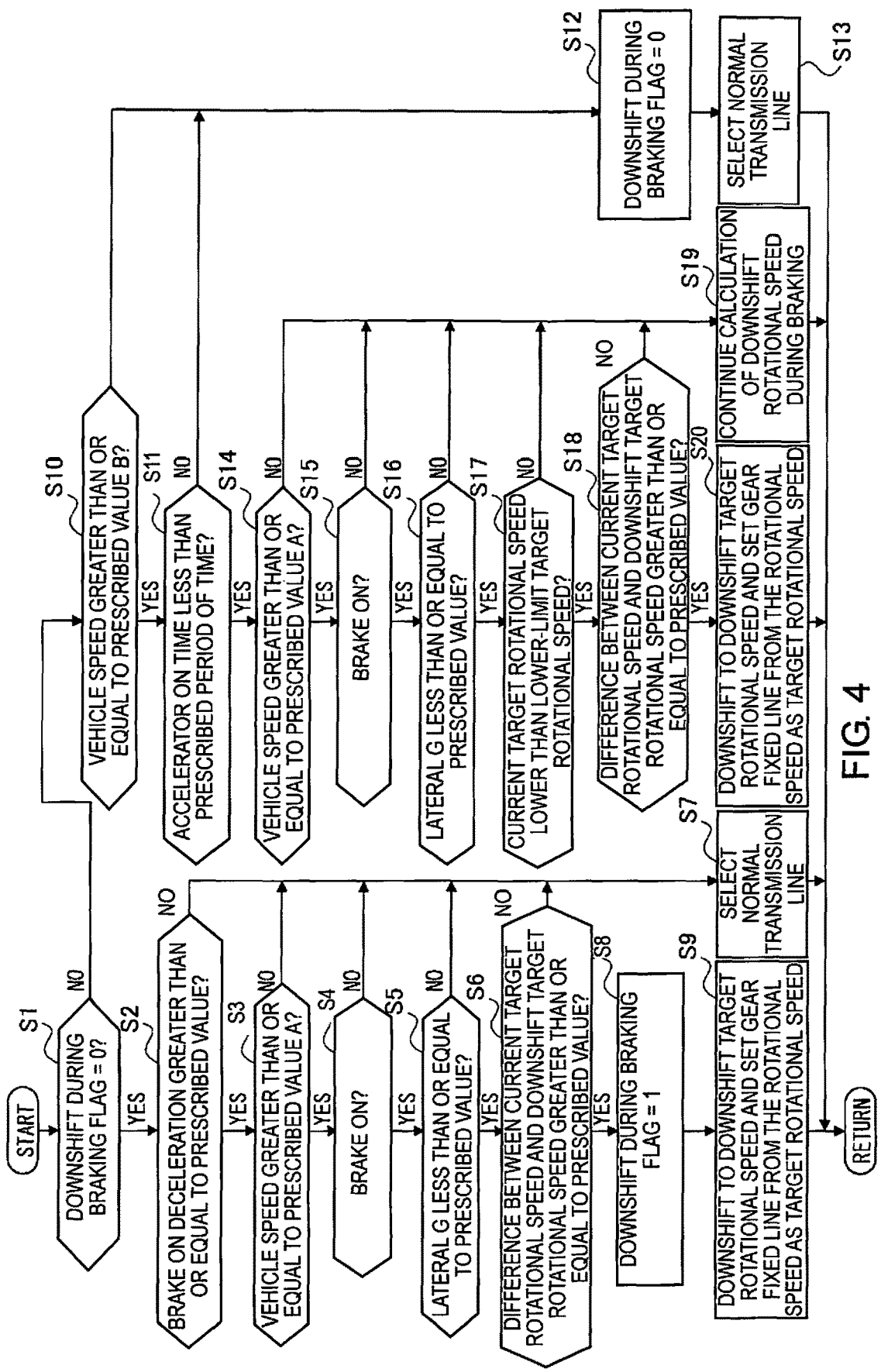
FIG. 4 is a flow chart illustrating a flow of a mode transition control process between a normal transmission mode and a pseudo-stepped downshift mode in a shift control executed in the CVT control unit according to the first embodiment.

FIG. 4 is a flow chart illustrating a flow of a mode transition control process between the normal transmission mode and the pseudo-stepped downshift mode (=AT-like downshift mode) in the shift control executed in the CVT control unit 8 according to the first embodiment. Each step in FIG. 4, which shows the configuration of the mode transition control process, will be described below.

In Step S1, it is determined whether a downshift during braking flag=0. If YES (downshift during braking flag=0), the process proceeds to Step S2, and if NO (downshift during braking flag=1), the process proceeds to Step S10. Here, "downshift during braking flag" is a flag that indicates whether the pseudo-stepped downshift mode is selected as the shifting mode. Therefore, downshift during braking flag=0 means that the normal transmission mode is being selected, and downshift during braking flag=1 means that the pseudo-stepped downshift mode is being selected.

In Step S2, following the determination that downshift during braking flag=0 in Step S1, it is determined whether deceleration (vehicle deceleration) in a brake-on state is a prescribed value or more. If YES (deceleration≥prescribed value), the process proceeds to Step S3, and if NO (deceleration<prescribed value), the process proceeds to Step S7. Here, "deceleration" is acquired from a time-differentiated value of the vehicle speed VSP and information from a longitudinal G sensor, and the like. The "prescribed value" is a value that is set as the vehicle deceleration that permits the pseudo-stepped downshift. That is, the "prescribed value" is a deceleration speed threshold that is set to exclude cases of a deceleration scenario, in which the vehicle speed decreases gradually even if the brake is on, such as when carrying out a slow braking operation.

In Step S3, following the determination that the deceleration≥prescribed value in Step S2, it is determined whether the vehicle speed VSP is a prescribed value A or greater. If YES (vehicle speed VSP≥prescribed value A), the process proceeds to Step S4, and if NO (vehicle speed VSP<prescribed value A), the process proceeds to Step S7. Here, the "prescribed value A" is a vehicle speed threshold value that is set as the vehicle speed at which the initiation of the pseudo-stepped downshift is permitted, and is a value of about 40 km/h, for example.

In Step S4, following the determination that vehicle speed VSP≥prescribed value A in Step S3, it is determined whether the brake is on. If YES (brake on), the process proceeds to Step S5, and if NO (brake off), the process proceeds to Step S7. Here, determination information regarding whether the brake is on is acquired from an ON/OFF signal from the brake switch 85.

In Step S5, following the determination that the brake is on in Step S4, it is determined whether a lateral G is a prescribed value or lower. If YES (lateral G≤prescribed value), the process proceeds to Step S6, and if NO (lateral G>prescribed value), the process proceeds to Step S7. Here, the "lateral G" is acquired from information from the lateral G sensor 86. The "prescribed value" is set to a threshold value for determining whether a change in the driving force that would inhibit a turning operation during turning is generated.

In Step S6, following the determination that lateral G≤prescribed value in Step S5, it is determined whether the difference between the current target rotational speed and the downshift target rotational speed is greater than or equal to a prescribed value. If YES (current target rotational speed−downshift target rotational speed≥prescribed value), the process proceeds to Step S8, and if NO (current target rotational speed−downshift target rotational speed<prescribed value), the process proceeds to Step S7. Here, the "current target rotational speed" refers to the target primary rotational speed Npri* determined using the current vehicle speed VSP and accelerator opening degree APO, and the shift schedule shown in FIG. 2. The "downshift target rotational speed" refers to a value determined according to a setting process shown in FIG. 5.

In Step S7, following a NO (not established) determination in any of the Steps S2, S3, S4, S5, S6, which are mode transition conditions to the pseudo-stepped downshift mode, a normal transmission line is selected, and the process proceeds to RETURN. Here, "selecting the normal transmission line" means selecting the normal transmission mode for determining the target primary rotational speed Npri* using the vehicle speed VSP and the accelerator opening degree APO, and the shift schedule shown in FIG. 2.

In Step S8, following a YES (established) determination in all of the Steps S2, S3, S4, S5, S6, which are mode transition conditions to the pseudo-stepped downshift mode, the downshift during braking flag is overwritten to "1", and the process proceeds to Step S9. Here, overwriting "downshift during braking flag=1" means to transition from the normal transmission mode to the pseudo-stepped downshift mode to initiate the pseudo-stepped downshift.

In Step S9, following the overwriting of downshift during braking flag=1 in Step S8, the primary rotational speed Npri at that time is increased to the downshift target rotational speed in a stepwise manner in order to downshift. Then, when the primary rotational speed Npri reaches the downshift target rotational speed, a gear fixed line is set as the target rotational speed, and the process proceeds to RETURN. Here, the "downshift target rotational speed" refers to a value determined according to the setting process shown in FIG. 5. "Setting the gear fixed line as the target rotational speed" means to set the target primary rotational speed Ppri* to a rotational speed that decreases as the vehicle speed VSP decreases along a fixed transmission ratio line, when the downshift target rotational speed is reduced to the lower-limit target rotational speed.

In Step S10, following the determination that downshift during braking flag=1 in Step S1, it is determined whether the vehicle speed is greater than or equal to a prescribed value B (<prescribed value A). If YES (vehicle speed≥prescribed value B), the process proceeds to Step S11, and if NO (vehicle speed<prescribed value B), the process proceeds to Step S12. Here, the "prescribed value B" is a vehicle speed threshold value that is set as the vehicle speed at which the pseudo-stepped downshift is canceled, and is a value of, for example, about 30 km/h, because there is the risk of the occurrence of pull-in shock due to LU disengagement shock or Low shift, if the vehicle speed is excessively pulled to a low vehicle speed. In addition, vehicle speed hysteresis is provided between the prescribed value A and the prescribed value B with the relationship of prescribed value A>prescribed value B, such that the pseudo-stepped downshift is not immediately canceled after being started.

In Step S11, following the determination that vehicle speed prescribed value B in step S10, it is determined whether an accelerator ON time is less than a prescribed period of time. If YES (accelerator ON time≤prescribed period of time), the process proceeds to Step S14, and if NO (accelerator ON time≥prescribed period of time), the process proceeds to Step S12. Here, the "accelerator ON time" is acquired from, for example, the duration of time in which the accelerator opening degree from the accelerator opening degree sensor 83 is greater than or equal to a ⅛ opening degree. The "prescribed period of time" is set as a threshold value for determining an acceleration request from the driver. That is, if the "accelerator ON time is less than the prescribed period of time," it is determined that there is no acceleration request from the driver, and if the "accelerator ON time is greater than or equal to the prescribed period of time," it is determined that there is an acceleration request from the driver.

In Step S12, following the determination that vehicle speed<prescribed value B in Step S10 or that accelerator ON time≥prescribed period of time in Step S11 (condition to cancel the pseudo-stepped downshift determined to be satisfied), the downshift during braking flag is overwritten to "0," and the process proceeds to Step S13. Here, overwriting "downshift during braking flag=0" means to transition from the pseudo-stepped downshift mode to the normal transmission mode to thereby stop the pseudo-stepped downshift and transition to the normal stepless transmission control.

In Step S13, following the overwriting of downshift during braking flag=0 in Step S12, the normal transmission line is selected, and the process proceeds to RETURN. Here, "selecting the normal transmission line" means selecting the normal transmission mode for determining the target primary rotational speed Npri* using the vehicle speed VSP and the accelerator opening degree APO, and the shift schedule shown in FIG. 2.

In Step S14, following the determination that accelerator ON time<prescribed period of time in Step S11 (condition to cancel the pseudo-stepped downshift determined to be not satisfied), it is determined whether the vehicle speed VSP is greater than or equal to the prescribed value A. If YES (vehicle speed VSP≥prescribed value A), the process proceeds to Step S15, and if NO (vehicle speed VSP<prescribed value A), the process proceeds to Step S19. Here, in the same manner as in Step S3, the "prescribed value A" is a vehicle speed threshold value that is set as the vehicle speed at which the initiation of the pseudo-stepped downshift is permitted and is a value of about 40 km/h, for example.

In Step S15, following the determination that vehicle speed VSP≥prescribed value A in Step S14, it is determined whether the brake is on. If YES (brake on), the process proceeds to Step S16, and if NO (brake off), the process proceeds to Step S19. Here, determination information regarding whether the brake is on is acquired, in the same manner as in Step S4, from the ON/OFF signal from the brake switch 85.

In Step S16, following the determination that the brake is on in Step S15, it is determined whether the lateral G is a prescribed value or lower. If YES (lateral G≤prescribed value), the process proceeds to Step S17, and if NO (lateral G>prescribed value), the process proceeds to Step S19. Here, in the same manner as in Step S5, the "lateral G" is acquired from information from the lateral G sensor 86. In the same manner as in Step S5, the "prescribed value" is set to a threshold value for determining whether a change in the driving force that would inhibit a turning operation during turning is generated.

In Step S17, following the determination that lateral G≤prescribed value in Step S16, it is determined whether the current target rotational speed is lower than the lower-limit target rotational speed. If YES (lower-limit target rotational speed>current target primary rotational speed), the process proceeds to Step S18, and if NO (lower-limit target rotational speed≤current target rotational speed), the process proceeds to Step S19. Here, the "lower-limit target rotational speed" refers to a value determined according to the setting process shown in FIG. 5. The "current target rotational speed" refers to the target primary rotational speed Npri* determined using the current vehicle speed VSP and accelerator opening degree APO and the shift schedule shown in FIG. 2.

In Step S18, following the determination that lower-limit target rotational speed>current target rotational speed in Step S17, it is determined whether the difference between the current target rotational speed and the downshift target rotational speed is greater than or equal to a prescribed value. If YES (current target rotational speed−downshift target rotational speed≥prescribed value), the process proceeds to Step S20, and if NO (current target rotational speed−downshift target rotational speed<prescribed value), the process proceeds to Step S19. Here, the "current target rotational speed" refers to the target primary rotational speed Npri* determined using the current vehicle speed VSP and accelerator opening degree APO, and the shift schedule shown in FIG. 2. The "downshift target rotational speed" refers to a value determined according to the setting process shown in FIG. 5.

In Step S19, following a NO (not established) determination in any of the Steps S14, S15, S16, S17, S18, which are conditions to permit the pseudo-stepped downshift mode, calculation of the current downshift rotational speed during braking is continued, and the process proceeds to RETURN. Here, "continuing the calculation of the current downshift rotational speed during braking" means setting the target primary rotational speed Npri* to a rotational speed that decreases together with the vehicle speed VSP at a decrease gradient (fixed transmission ratio gradient in the case of the first embodiment) that is used in the pseudo-stepped downshift, and maintaining the lower-limit target rotational speed after reaching the lower-limit target rotational speed.

In Step S20, following a YES (established) determination in all of the Steps S14, S15, S16, S17, S18, which are conditions to permit the pseudo-stepped downshift mode, the primary rotational speed Npri at that time is increased in a stepwise manner to the downshift target rotational speed in order to downshift. Then, when the primary rotational speed Npri reaches the downshift target rotational speed, a gear fixed line is set as the target rotational speed, and the process proceeds to RETURN. Here, the "downshift target rotational speed" refers to a value determined according to the setting process shown in FIG. 5. In the same manner as in Step S9, "setting the gear fixed line as the target rotational speed" means to set the target primary rotational speed Ppri* to a rotational speed that decreases as the vehicle speed VSP decreases along a fixed transmission ratio line, when the downshift target rotational speed is lowered to the lower-limit target rotational speed.

Figure 5:
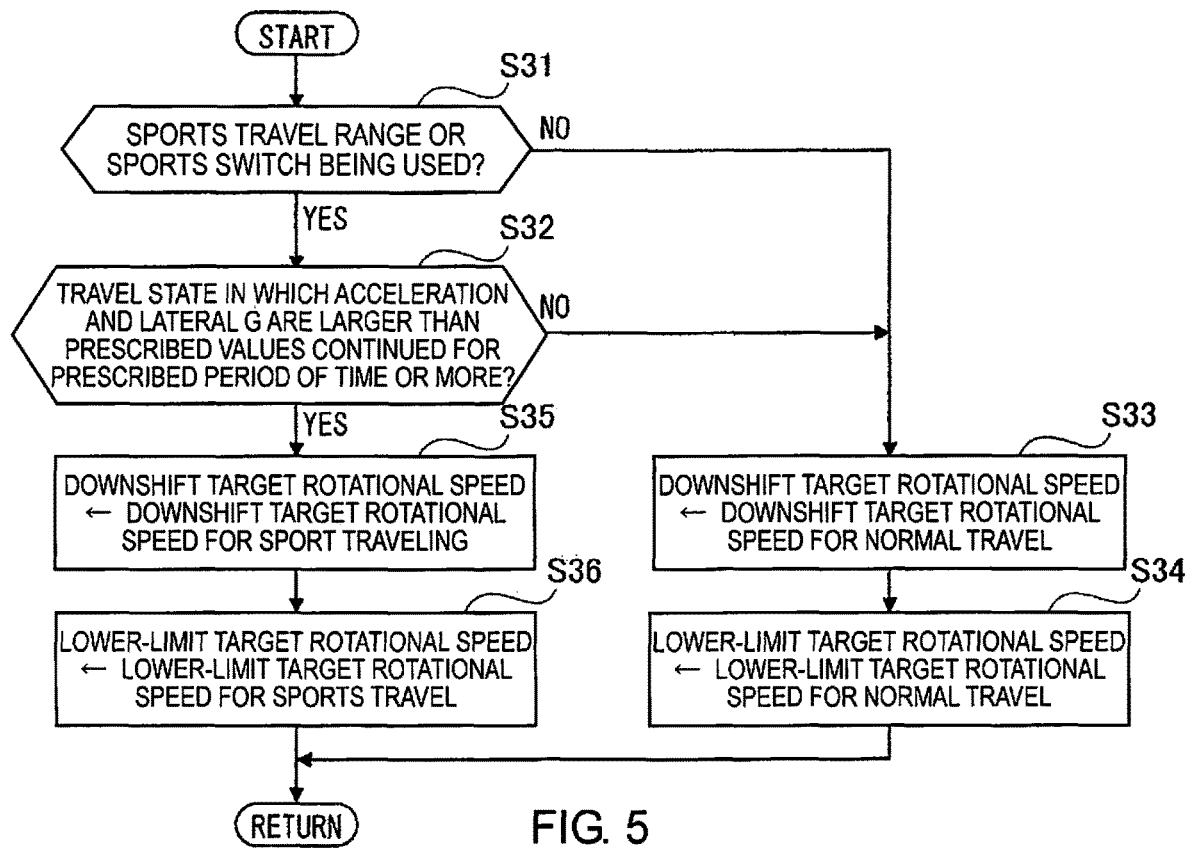
FIG. 5 is a flow chart illustrating the flow of a process for setting the downshift target rotational speed and the lower-limit target rotational speed used in the pseudo-stepped downshift according to the first embodiment.

Configuration of the Process for Setting the Target Rotational Speed Used in the Pseudo-Stepped Downshift FIG. 5 is a flow chart illustrating the flow of the process for setting the downshift target rotational speed and the lower-limit target rotational speed used in the pseudo-stepped downshift according to the first embodiment. Each step in FIG. 5, which shows the configuration of the process for setting the target rotational speed used in the pseudo-stepped downshift, will be described below.

In Step S31, it is determined whether the vehicle is in a sports travel range or a sports switch is being used. If YES (sports travel mode selected), the process proceeds to Step S32, and if NO (sports travel mode not selected), the process proceeds to Step S33. Here, whether the vehicle is in the "sports travel range" is determined by use of a range position signal from the inhibitor switch 84. Whether the "sports switch is being used" is determined according to whether the switch signal from the sports switch 87 is an ON signal or an OFF signal.

In Step S32, following the determination that the sports travel mode is not selected in Step S31, it is determined whether a state in which the acceleration/deceleration and the lateral G are greater than prescribed values has continued for a prescribed period of time or more. If YES (sports travel estimated), the process proceeds to Step S35, and if NO (normal travel estimated), the process proceeds to Step S33.

In Step S33, following the determination that the sports travel mode is not selected in Step S31, or that normal travel is estimated in Step S32, a downshift target rotational speed for normal travel is set as the downshift target rotational speed, and the process proceeds to Step S34.

In Step S34, following the setting of the downshift target rotational speed in Step S33, a lower-limit target rotational speed for normal travel is set as the lower-limit target rotational speed, and the process proceeds to RETURN.

In Step S35, following the determination that sports travel is estimated in Step S32, a downshift target rotational speed for sport travel is set as the downshift target rotational speed, and the process proceeds to Step S36.

In Step S36, following the setting of the downshift target rotational speed in Step S35, a lower-limit target rotational speed for sports travel is set as the lower-limit target rotational speed, and the process proceeds to RETURN.

Setting of a downshift target rotational speed Nt2 during normal travel, a lower-limit target rotational speed Nt1 during normal travel, a downshift target rotational speed Nt4 during sports travel, and a lower-limit target rotational speed Nt3 during sports travel, will be described.

Figure 6:
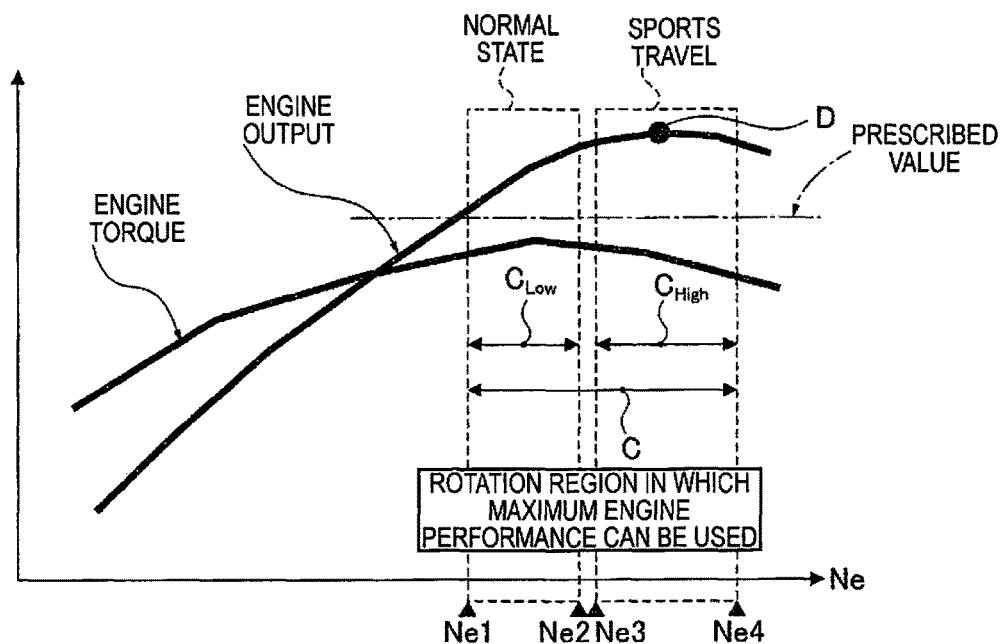
FIG. 6 is an engine torque characteristic and engine output characteristic view diagram illustrating the engine rotational speed regions that are set as the downshift target rotational speed and the lower-limit target rotational speed used in the pseudo-stepped downshift according to the first embodiment.

First, a downshift target rotational speed Nta and a lower-limit target rotational speed Ntb used in the pseudo-stepped downshift are set to values in the engine rotational speed region in which the engine output in the maximum range can be obtained, using the engine output characteristic showing the relationship between the engine rotational speed Ne and the engine output, illustrated in FIG. 6. That is, the target rotational speeds are set to values in a rotational speed region C in which the engine output is greater than or equal to a prescribed value and in which the engine performance can be maximized, as illustrated in FIG. 6.

Then, when it is determined that the driver's travel state is normal travel, the downshift target rotational speed Nt2 and the lower-limit target rotational speed Nt1 during normal travel are set to values in a first engine rotational speed region CLow, which is within the rotational speed region C and ahead of the maximum engine output in the engine output characteristic. Specifically, the lower-limit target rotational speed Nt1 is set to Ne1 in the lowest rotational speed region of the first engine rotational speed region CLow, and the downshift target rotational speed Nt2 is set to Ne2 in the maximum rotational speed region of the first engine rotational speed region CLow.

When it is determined that the driver's travel state is sports travel, the downshift target rotational speed Nt4 and the lower-limit target rotational speed Nt3 during sports travel are set to values in a second engine rotational speed region CHigh, which is within the of the rotational speed region C and includes a maximum engine output D in the engine output characteristic. Specifically, the lower-limit target rotational speed Nt3 is set to Ne3 in the lowest rotational speed region of the second engine rotational speed region CHigh, and the downshift target rotational speed Nt4 is set to Ne3 in the maximum rotational speed region of the second engine rotational speed region CHigh. That is, the relationship between each of the target rotational speeds satisfies Nt1(Ne1)<Nt2(Ne2)<Nt3(Ne3)<Nt4(Ne4). The first engine rotational speed region CLow and the second engine rotational speed region CHigh may partially overlap, and the relationship between each of the target rotational speeds may satisfy Nt1(Ne1)<Nt3(Ne3)<Nt2(Ne2)<Nt4 (Ne4). Moreover, the relationship between each of the target rotational speeds may satisfy Nt1(Ne1)<Nt2 (Ne2)=Nt3 (Ne3)<Nt4(Ne4).

The actions are described next. The "action of the mode transition control process," "action of the target rotational speed setting process," "action of the pseudo-stepped downshift when there is no intervention by a driver operation," "action of the pseudo-stepped downshift when there is an intervention by a driver operation," and "characteristic action of the shift control" will be described separately regarding the actions of the first embodiment.

Action of the Mode Transition Control Process

The action of the mode transition control process between the normal transmission mode and the pseudo-stepped downshift mode will be described with reference to the flow chart of FIG. 4.

If a brake depression operation is carried out from an accelerator foot release operation during travel with the normal transmission mode selected, a flow that progresses from Step S1→Step S2→Step S7→RETURN in the flow chart of FIG. 4 is repeated as long as the vehicle deceleration is less than a prescribed value. It is assumed that, in Step S7, the selection of the normal transmission mode is continued.

Furthermore, it is assumed that the vehicle deceleration becomes greater than or equal to a prescribed value and a YES (established) determination is made in all of the Steps S2, S3, S4, S5, S6, which are mode transition conditions to the pseudo-stepped downshift mode. In this case, the process proceeds from Step S1→Step S2→Step S3→Step S4→Step S5→Step S6→Step S8, in the flow chart of FIG. 4. In Step S8, the downshift during braking flag is overwritten from "0" to "1." Accordingly, the shifting mode transitions from the normal transmission mode to the pseudo-stepped transmission mode, the process proceeds from Step S8 to Step S9, and the pseudo-stepped downshift is initiated. In Step S9, the primary rotational speed Npri at that time is increased to the downshift target rotational speed in a stepwise manner in order to downshift. Then, when the primary rotational speed Npri reaches the downshift target rotational speed, a rotational speed that decreases as the vehicle speed VSP decreases on a fixed transmission ratio line is set as the target primary rotational speed Npri*.

In the subsequent control cycle, because the downshift during braking flag has been overwritten from "0" to "1," the process proceeds from Step S1 to Step S10 in the flow chart of FIG. 4. At this time, it is assumed that the condition to cancel the pseudo-stepped downshift is not satisfied and the condition to permit the pseudo-stepped downshift is satisfied but the primary rotational speed Npri has not reached the lower-limit target rotational speed. At this time, a flow that proceeds from Step S1→Step S10→Step S11 →Step S14→Step S15→Step S16→Step S17→Step S19→RETURN in the flow chart of FIG. 4 is repeated until the primary rotational speed reaches the lower-limit target rotational speed. In Step S19, the current calculation of the downshift rotational speed during braking is continued. Thereafter, when the primary rotational speed Npri reaches the lower-limit target rotational speed, the process proceeds from Step S17 to Step S18→Step S20 in the flow chart of FIG. 4. In Step S20, the primary rotational speed Npri in the lower-limit target rotational speed region is increased again to the downshift target rotational speed in a stepwise manner in order to downshift. Then, when the primary rotational speed Npri reaches the downshift target rotational speed, a rotational speed that decreases as the vehicle speed VSP decreases on the fixed transmission ratio line is set as the target primary rotational speed Npri*.

That is, if the cancellation condition is not satisfied and the permission condition is satisfied after the pseudo-stepped downshift is initiated, the primary rotational speed Npri is decreased to the lower-limit target rotational speed by use of a flow that proceeds from Step S17 to Step S19 in the flow chart of FIG. 4. When the primary rotational speed Npri reaches the lower-limit target rotational speed, the primary rotational speed Npri is increased again to the downshift target rotational speed in a stepwise manner, by use of a flow that proceeds from Step S17 to Step S18→Step S20. By repeating this flow, the pseudo-stepped downshift, in which the primary rotational speed Npri is increased to the downshift target rotational speed in a stepwise manner and then decreased to the lower-limit target rotational speed, is repeated a plurality of times.

When the vehicle speed VSP becomes less than the prescribed value B while executing the pseudo-stepped downshift, a flow that progresses from Step S1→Step S10 →Step S12→Step S13→RETURN in the flow chart of FIG. 4 is repeated. In Step S12, the downshift during braking flag is overwritten from "1" to "0." Accordingly, the shifting mode transitions from the pseudo-stepped downshift mode to the normal transmission mode and the process proceeds from Step S12 to Step S13 to thereby return to the normal stepless transmission control that uses the shift schedule of FIG. 2.

The flow described above is the basic flow of the mode transition control process; at the time of a braking deceleration, the mode transitions from the normal transmission mode to the pseudo-stepped downshift mode when the mode transition condition is satisfied, and the pseudo-stepped downshift is initiated. Once the pseudo-stepped downshift is initiated, the pseudo-stepped downshift, wherein the primary rotational speed Npri is increased to the downshift target rotational speed and the downshift target rotational speed is reduced to the lower-limit target rotational speed, are repeated until the mode cancellation condition, which includes a re-acceleration request, is satisfied. Then, when the mode cancellation condition, which includes the re-acceleration request, is satisfied, the mode transitions from the pseudo-stepped downshift mode to the normal transmission mode, to thereby return to the normal stepless transmission control that uses the shift schedule of FIG. 2.

Next, a flow will be described in which the selection of the normal transmission mode is maintained without a mode transition to the pseudo-stepped downshift mode during a braking deceleration.

If the vehicle deceleration is greater than or equal to a prescribed value but the vehicle speed is less than the prescribed value A during a braking deceleration, the process proceeds from Step S1→Step S2→Step S3→Step S7→RETURN in the flow chart of FIG. 4. In Step S7, the mode transition condition is considered unsatisfied, and the selection of the normal transmission mode is maintained.

If the vehicle deceleration is greater than or equal to the prescribed value and the lateral G of the vehicle exceeds a prescribed value during the braking deceleration, the process proceeds from Step S1→Step S2→Step S3→Step S4→Step S5→Step S7→RETURN in the flow chart of FIG. 4. In Step S7, the mode transition condition is considered unsatisfied, and the selection of the normal transmission mode is maintained.

If the vehicle deceleration is greater than or equal to the prescribed value but the difference between the current target primary rotational speed Npri* and the downshift target rotational speed is less than a prescribed value during the braking deceleration, the process proceeds from Step S1→Step S2→Step S3→Step S4→Step S5→Step S6→Step S7→RETURN in the flow chart of FIG. 4. In Step S7, the mode transition condition is considered unsatisfied, and the selection of the normal transmission mode is maintained.

As described above, the shift control when the selection of the normal transmission mode is maintained during the braking deceleration will be described with reference to FIG. 2. When the operating point (VSP, APO) is at point E and the foot is removed from the accelerator, the operating point (VSP, APO) moves to point F, after which, if the brake is operated to decelerate, the operating point moves from point F to point G along the coasting shift line. Then, downshift is carried out from point G at the highest transmission ratio to point H while maintaining the low target primary rotational speed Npri*, as the vehicle speed VSP decreases. When point H at the lowest transmission ratio is reached, the target primary rotational speed Npri* decreases as the vehicle speed VSP decreases, and the vehicle stops at point I. In this manner, the shift control of the normal transmission mode is a control in which the target primary rotational speed Npri* transitions in a low rotational speed region.

Next, a flow in which the mode cancellation condition (re-acceleration request condition) is satisfied after the pseudo-stepped downshift is initiated will be described. After the pseudo-stepped downshift is initiated, when the accelerator ON time becomes greater than or equal to a prescribed period of time by use of an intervention by an accelerator depression operation in the middle of the pseudo-stepped downshift, the process proceeds from Step S1→Step S10→Step S11→Step S12→Step S13→RETURN in the flow chart of FIG. 4. In Step S12 and Step S13, the shifting mode transitions from the pseudo-stepped downshift mode to the normal transmission mode, to return to the normal stepless transmission control. That is, the engine rotational speed (=primary rotational speed Npri) transitions in the rotational speed region in which the engine output is in the maximum range while the pseudo-stepped downshift is being executed. Accordingly, when the pseudo-stepped downshift is canceled to return to the normal stepless transmission control as a result of the intervention by the accelerator depression operation in the middle of the pseudo-stepped downshift, the engine output reaches the maximum range with good responsiveness.

Next, a flow in which the mode cancellation condition is not satisfied and the condition to permit the pseudo-stepped downshift is not satisfied after the pseudo-stepped downshift is initiated will be described. It is assumed that, after the pseudo-stepped downshift is initiated, the mode cancellation condition is not satisfied (NO in Step S10, S11) and the condition to permit the pseudo-stepped downshift is not satisfied (NO in any one of S14, S15, S16, S17, S18). At this time, the process proceeds to Step S19, and a control is carried out in which the target primary rotational speed Npri* is set to a rotational speed that decreases together with the vehicle speed VSP at the decrease gradient (fixed transmission ratio gradient) that is used in the pseudo-stepped downshift, and the lower-limit target rotational speed is maintained after reaching the lower-limit target rotational speed. That is, if the condition to permit the pseudo-stepped downshift is not satisfied and it is inconvenient to continue the pseudo-stepped downshift, a control to maintain the lower-limit target rotational speed and a fixed transmission ratio control used in the transient control of the pseudo-stepped downshift are carried out. Then, while maintaining the fixed transmission ratio control, the process waits until the mode cancellation condition is satisfied and the process is then handed off to the normal transmission mode.

Action of the Target Rotational Speed Setting Process

The action of the target rotational speed setting process used in the pseudo-stepped downshift will be described with reference to the flow chart of FIG. 5.

When the sports travel mode is not selected, the process proceeds from Step S31→Step S33→Step S34→RETURN in the flow chart of FIG. 5. When the sports travel mode is selected but normal travel is estimated, the process proceeds from Step S31→Step S32→Step S33→Step S34→RETURN in the flow chart of FIG. 5. In Step S33, the downshift target rotational speed for normal travel is set as the downshift target rotational speed Nt2. In the subsequent Step S34, the lower-limit target rotational speed for normal travel is set as the lower-limit target rotational speed Nt1.

When the sports travel mode is not selected but sports travel is estimated, the process proceeds from Step S31→Step S32→Step S35→Step S36→RETURN in the flow chart of FIG. 5. In Step S35, the downshift target rotational speed for sports travel is set as the downshift target rotational speed Nt4. In Step S36, the lower-limit target rotational speed for sports travel is set as the lower-limit target rotational speed Nt3.

In this manner, the downshift target rotational speed and the lower-limit target rotational speed are set differently for the case of normal travel and the case of sports travel. Moreover, during normal travel, the downshift target rotational speed Nt2 and the lower-limit target rotational speed Nt1 are set to values in a first engine rotational speed region CLow, which is within the rotational speed region C and is ahead of the maximum engine output in the engine output characteristic, wherein the engine output is greater than or equal to a prescribed value, as illustrated in FIG. 6. During sports travel, on the other hand, the downshift target rotational speed Nt4 and the lower-limit target rotational speed Nt3 are set to values in a second engine rotational speed region CHigh, which is within the rotational speed region C and which includes the maximum engine output D in the engine output characteristic, wherein the engine output is greater than or equal to a prescribed value.

Figure 7:
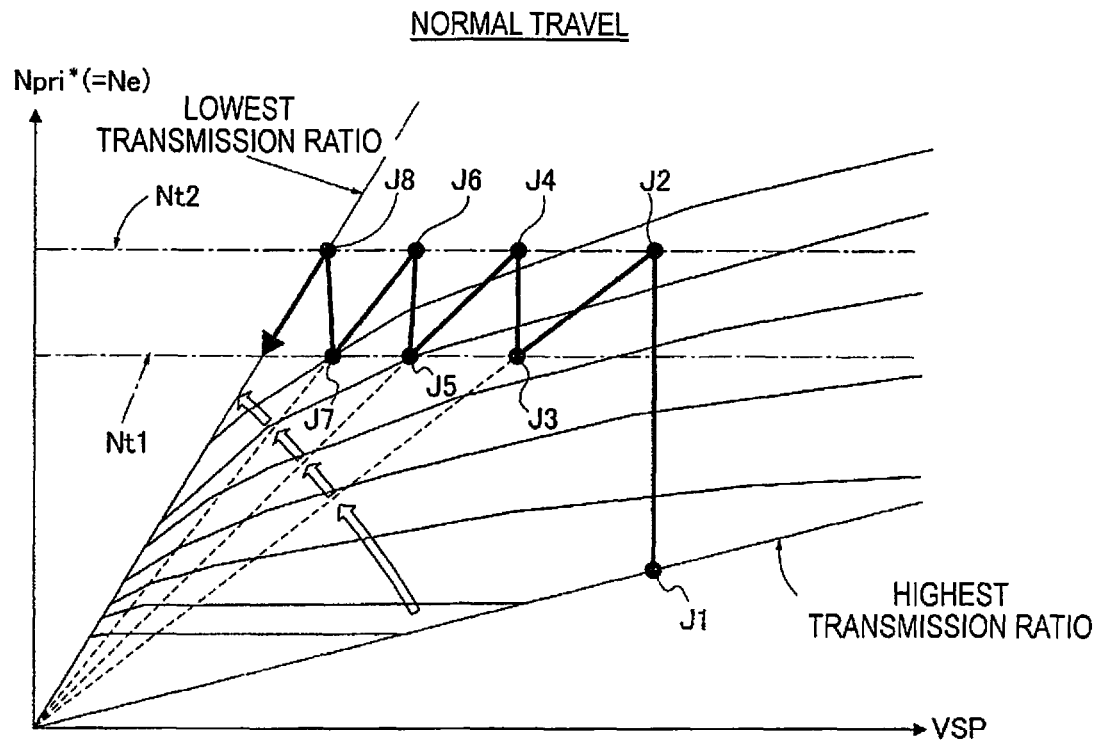
FIG. 7 is a pseudo-stepped downshift characteristic diagram illustrating the states in which the target primary rotational speed changes on the shift schedule when the pseudo-stepped downshift is executed during normal travel according to the first embodiment.
Figure 8:
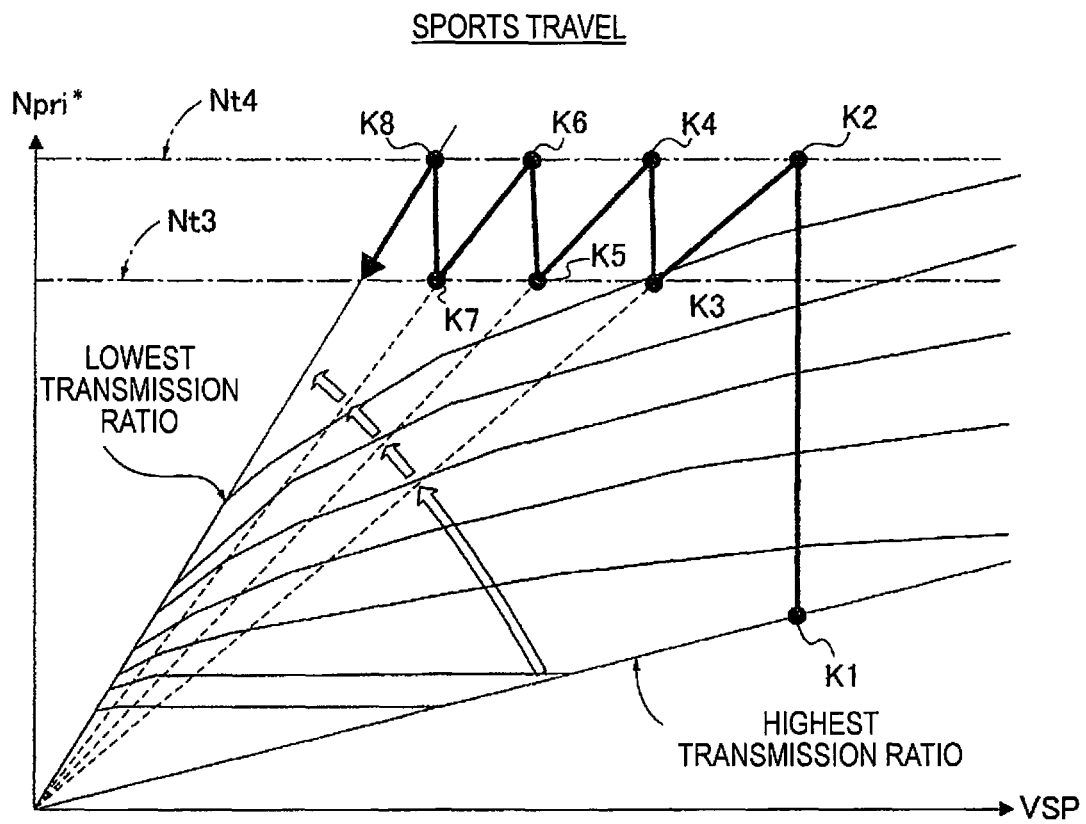
FIG. 8 is a pseudo-stepped downshift characteristic diagram illustrating the states in which the target primary rotational speed changes on the shift schedule when the pseudo-stepped downshift is executed during sports travel according to the first embodiment.

Accordingly, the basic pseudo-stepped downshift operation, which is executed as the mode transitions from the normal transmission mode to the pseudo-stepped downshift mode when the mode transition condition is satisfied during the braking deceleration, has two pseudo-stepped downshift patterns, as illustrated in FIGS. 7 and 8.

In the pseudo-stepped downshift pattern during normal travel, when the pseudo-stepped downshift is initiated at point J1, a first stage downshift is carried out, in which the target primary rotational speed Npri* increases at once to point J2 on the downshift target rotational speed Nt2 during normal travel, as illustrated in FIG. 7. When the target primary rotational speed Npri* decreases from point J2 along the fixed transmission ratio line to point J3 of the lower-limit target rotational speed Nt1 during normal travel, a second stage downshift is carried out to increase the target primary rotational speed again to point J4 of the downshift target rotational speed Nt2. When the target primary rotational speed Npri* decreases from point J4 along the fixed transmission ratio line to point J5 of the lower-limit target rotational speed Nt1, a third stage downshift is carried out to increase the target primary rotational speed again to point J6 of the downshift target rotational speed Nt2. When the target primary rotational speed Npri* decreases from point J6 along the fixed transmission ratio line to point J7 of the lower-limit target rotational speed Nt1, a fourth stage downshift is carried out to increase the target primary rotational speed again to point J8 of the downshift target rotational speed Nt2. Then, the target primary rotational speed Npri* decreases from point J8 along the lowest transmission ratio line.

In the pseudo-stepped downshift pattern during sports travel, when the pseudo-stepped downshift is initiated at point K1, a first stage downshift is carried out, in which the target primary rotational speed Npri* increases at once to point K2 on the downshift target rotational speed Nt4 during sports travel, as illustrated in FIG. 8. When the target primary rotational speed Npri* decreases from point K2 along the fixed transmission ratio line to point K3 of the lower-limit target rotational speed Nt3 during sports travel, a second stage downshift is carried out to increase the target primary rotational speed again to point K4 of the downshift target rotational speed Nt4. When the target primary rotational speed Npri* decreases from point K4 along the fixed transmission ratio line to point K5 of the lower-limit target rotational speed Nt3, a third stage downshift is carried out to increase the target primary rotational speed again to point K6 of the downshift target rotational speed Nt4. When the target primary rotational speed Npri* decreases from point K6 along the fixed transmission ratio line to point K7 of the lower-limit target rotational speed Nt3, a fourth stage downshift is carried out to increase the target primary rotational speed again to point K8 of the downshift target rotational speed Nt4. Then, the target primary rotational speed Npri* decreases from point K8 along the lowest transmission ratio line.

In this manner, the amount of increase in the target primary rotational speed Npri* is greater in the pseudo-stepped downshift pattern during normal travel (FIG. 7) compared to the pseudo-stepped downshift pattern during sports travel (FIG. 8). In addition, the pseudo-stepped downshift is carried out in a region with a higher engine rotational speed Ne in the pseudo-stepped downshift pattern during normal travel (FIG. 7) compared to in the pseudo-stepped downshift pattern during sports travel (FIG. 8).

Figure 9:
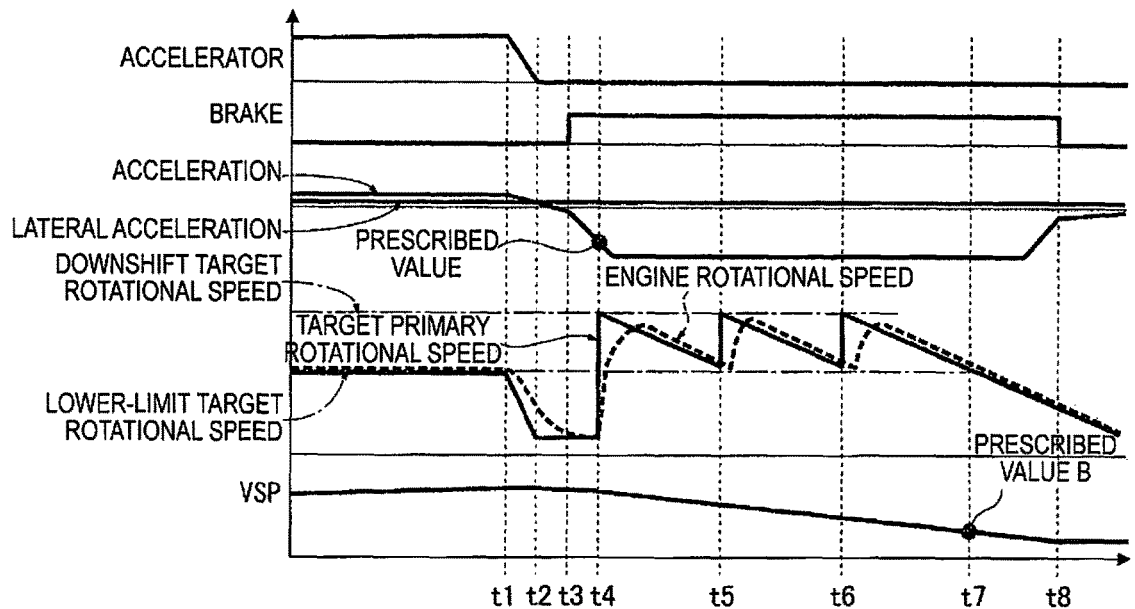
FIG. 9 is a time chart illustrating each characteristic in a case in which there is no intervention by a driver operation when the pseudo-stepped downshift is executed during a braking deceleration according to the first embodiment.

Action of the Pseudo-Stepped Downshift When There is No Intervention by a Driver Operation The action of the pseudo-stepped downshift when there is no intervention by a driver operation (turning operation and accelerator operation) after the pseudo-stepped downshift is initiated will be described with reference to the time chart shown in FIG. 9.

When the accelerator foot release operation is initiated at time t1, the target primary rotational speed Npri* decreases accordingly. When the foot is off the accelerator at time t2 and a brake depression operation is carried out at time t3 immediately thereafter, the vehicle starts braking deceleration. When the deceleration becomes greater than or equal to a prescribed value at time t4 due to the braking deceleration and the mode transition condition is satisfied, the target primary rotational speed Npri* increases to the downshift target rotational speed in a stepwise manner. When the target primary rotational speed Npri* reaches the downshift target rotational speed at time t4, the target primary rotational speed Npri* decreases as the vehicle speed VSP decreases along the fixed transmission ratio line from time t4 to time t5. At time t5, when the target primary rotational speed Npri* reaches the lower-limit target rotational speed, the target primary rotational speed Npri* is increased again to the downshift target rotational speed in a stepwise manner. When the target primary rotational speed Npri* reaches the downshift target rotational speed at time t5, the target primary rotational speed Npri* decreases as the vehicle speed VSP decreases along the fixed transmission ratio line from time t5 to time t6. At time t6 when the target primary rotational speed Npri* reaches the lower-limit target rotational speed, the target primary rotational speed Npri* is increased again to the downshift target rotational speed in a stepwise manner. When the target primary rotational speed Npri* reaches the downshift target rotational speed at time t6, the target primary rotational speed Npri* decreases as the vehicle speed VSP decreases along the fixed transmission ratio line after time t6. Then, when the vehicle speed condition to cancel the mode transition (vehicle speed<prescribed value B) is satisfied at time t7, the pseudo-stepped downshift is canceled, and when the brake is released at time t8, the vehicle enters an extremely low speed state, in which the deceleration is low.

In this manner, in the pseudo-stepped downshift when there is no intervention by the driver operation (turning operation and accelerator operation) after the pseudo-stepped downshift is initiated, the increase in the engine rotational speed occurs a plurality of times, as if in a downshift in a stepped transmission. That is, a three-stage downshift is simulated, in which the engine rotational speed greatly increases from time t4 and then decreases, again greatly increases from time t5 and then decreases, and again greatly increases from time t6 and then decreases.

Action of the Pseudo-Stepped Downshift When There is Intervention by the Driver Operation The action of the pseudo-stepped downshift when there is an intervention by the driver operation (turning operation and accelerator operation) after the pseudo-stepped downshift is initiated will be described with reference to the time chart shown in FIG. 10.

When the accelerator foot release operation is initiated at time t1, the target primary rotational speed Npri* decreases accordingly. When the foot is off the accelerator at time t2 and a brake depression operation is carried out at time t3 immediately thereafter, the vehicle starts the braking deceleration. When the deceleration becomes greater than or equal to a prescribed value at time t4 due to the braking deceleration and the mode transition condition is satisfied, the target primary rotational speed Npri* increases to the downshift target rotational speed in a stepwise manner. When the target primary rotational speed Npri* reaches the downshift target rotational speed at time t4, the target primary rotational speed Npri* decreases as the vehicle speed VSP decreases along the fixed transmission ratio line from time t4 to time t6. However, if the lateral acceleration increases due to an intervention of the turning operation at time t5, and the condition becomes a condition to not permit the pseudo-stepped downshift (lateral G>prescribed value) at time t6, the target primary rotational speed Npri* is maintained at the lower-limit target rotational speed after time t6. Then, when the accelerator ON operation intervenes after the brake OFF operation at time t7, and the mode cancellation condition (accelerator ON time prescribed ≥period of time) is satisfied at time t8, the pseudo-stepped downshift mode is canceled, and the control state returns to the normal stepless transmission control.

In this manner, before an intervention by a driver operation after the pseudo-stepped downshift is initiated, the engine rotational speed increases as if in a downshift of a stepped transmission. However, if there is an intervention by a turning operation, the pseudo-stepped downshift for increasing the engine rotational speed is not permitted and the engine rotational speed is maintained at the lower-limit target rotational speed. Thereafter, if there is an intervention by an accelerator operation, the pseudo-stepped downshift mode is canceled but the engine rotational speed is in the lower-limit target rotational speed region. Accordingly, the engine rotational speed increases with good responsiveness with respect to a re-acceleration request made by use of an accelerator depression, as shown by the circled engine rotational speed characteristic indicated by arrow L in FIG. 10, and an acceleration response is secured as indicated by the circled vehicle speed characteristic indicated by arrow M in FIG. 10.

Characteristic Action of the Shift Control

In the first embodiment, the downshift target rotational speed Nta and the lower-limit target rotational speed Ntb used for the pseudo-stepped downshift are set to values in the engine rotational speed region in which the engine output becomes greater than or equal to a prescribed value. When a mode transition condition is satisfied during deceleration by selecting the normal transmission mode, the mode is shifted to the pseudo-stepped downshift mode to start the pseudo-stepped downshift. When the pseudo-stepped downshift is initiated, an increase to the downshift target rotational speed Nta and a decrease to the lower-limit target rotational speed Ntb of the primary rotational speed Npri are repeated, until the mode cancellation condition, including the re-acceleration request, is satisfied.

That is, in the pseudo-stepped downshift, an increase to the downshift target rotational speed Nta and a decrease to the lower-limit target rotational speed Ntb of the primary rotational speed Npri are repeated in order to simulate a stepped downshift. Accordingly, it is possible to continue the linearity in the change in the vehicle speed VSP and the change in the engine rotation as if a downshift were being carried out in a stepwise manner by use of a stepped transmission, even though a continuously variable transmission is being used, thereby improving the feeling during deceleration. In the pseudo-stepped downshift, the stepped downshift is simulated using the rotational speed region in which the engine output becomes high. Accordingly, it is possible to accelerate with good responsiveness from the region in which the engine output (engine power) is high at the time of re-acceleration, when the pseudo-stepped downshift is canceled due to a re-acceleration request, thereby improving the acceleration response.

In the first embodiment, the downshift target rotational speed Nta and the lower-limit target rotational speed Ntb are set to values in the engine rotational speed region corresponding to the engine output region C in which the maximum engine performance can be used, using the engine output characteristic (FIG. 6) indicating the relationship between the engine rotational speed and the engine output.

Accordingly, it is possible to accelerate with good responsiveness from the maximum engine output (engine power) region at the time of re-acceleration, when the pseudo-stepped downshift is canceled due to a re-acceleration request, thereby further improving the acceleration response.

In the first embodiment, the downshift target rotational speed Nta and the lower-limit target rotational speed Ntb are set to the downshift target rotational speed Nt2 and the lower-limit target rotational speed Nt1 in the first engine rotational speed region CLow ahead of the maximum engine output D of the engine output characteristic, when normal travel is determined. When sports travel is determined, the target rotational speeds are set to the downshift target rotational speed Nt4 and the lower-limit target rotational speed Nt3 in the second engine rotational speed region CHigh, including the maximum engine output D, of the engine output characteristic.

That is, if the downshift target rotational speed and the lower-limit target rotational speed used in the pseudo-stepped downshift are set based on normal travel, the driver's operation request cannot be satisfied during sports travel. Similarly, if the downshift target rotational speed and the lower-limit target rotational speed used in the pseudo-stepped downshift are set based on sports travel, the driver's operation request cannot be satisfied during normal travel. In contrast, by setting the downshift target rotational speed Nta and the lower-limit target rotational speed Ntb for each of the normal travel and the sports travel, it is possible to provide vehicle performance in accordance with the driver's operation request, which improves drivability.

In the first embodiment, the mode transition condition is satisfied when the vehicle deceleration becomes greater than or equal to a prescribed value during braking deceleration by a braking operation.

That is, the demand for deceleration is greater during a braking deceleration by a braking operation, which represents an intention to decelerate, compared to a deceleration due to the foot being removed from the accelerator. In addition, when the vehicle deceleration is low, there is a smooth deceleration intention, and the demand for the pseudo-stepped downshift is low. Accordingly, by using the mode transitioning to the pseudo-stepped downshift mode when the vehicle deceleration becomes greater than or equal to the prescribed value at the time of the braking deceleration, the pseudo-stepped downshift that corresponds to the driver's deceleration request and intention to decelerate is executed.

In the first embodiment, the mode transition condition is not satisfied when the vehicle deceleration is greater than or equal to the prescribed value but the vehicle speed VSP is less than the prescribed value A at the time of the braking deceleration, and the selection of the normal transmission mode is maintained.

That is, in the case of the continuously variable transmission, if the vehicle speed VSP is less than the prescribed value A, the transmission ratio is on the lowest transmission ratio side, which is a region in which further downshifting is not required. Accordingly, if the vehicle speed VSP is less than the prescribed value A, the pseudo-stepped downshift is not executed in the vehicle speed region in which the downshift is not required by maintaining the selection of the normal transmission mode, to thereby avoid the generation of shift shock.

In the first embodiment, the mode transition condition is not satisfied when the vehicle deceleration is greater than or equal to the prescribed value and the lateral G of the vehicle exceeds a prescribed value at the time of the braking deceleration, and the selection of the normal transmission mode is maintained.

That is, if the pseudo-stepped downshift is executed during a turn when the lateral G exceeds the prescribed value, changes in the driving force accompanying variations in the engine rotational speed inhibit the turning operation. In contrast, by maintaining the selection of the normal transmission mode when the lateral G of the vehicle exceeds the prescribed value, changes in the driving force during turning is suppressed, so that the turning operation is not inhibited.

In the first embodiment, the mode transition condition is not satisfied when the vehicle deceleration is greater than or equal to the prescribed value and the difference between the current target primary rotational speed Npri* and the downshift target rotational speed is less than the prescribed value at the time of the braking deceleration, and the selection of the normal transmission mode is maintained.

That is, in the pseudo-stepped downshift, if the amount of increase for raising the current target primary rotational speed Npri* to the downshift target rotational speed is small, not only is the feeling of a stepped downshift unachievable, but also rotation hunting occurs, in which the engine rotational speed undergoes repeated rising and falling within a narrow rotational speed range. In contrast, by not executing the pseudo-stepped downshift when the amount of increase for raising the current target primary rotational speed Npri* to the downshift target rotational speed is small, rotation hunting is eliminated, and it is possible to avoid the imparting of discomfort to the driver.

In the first embodiment, in the mode transition condition, the prescribed value A is set as the vehicle speed condition with which to determine the initiation of the pseudo-stepped downshift. The mode cancellation condition is satisfied when the vehicle speed VSP becomes less than the prescribed value B, which is a lower vehicle speed than the prescribed value A after initiating the pseudo-stepped downshift, and the mode transitions from the pseudo-stepped downshift mode to the normal transmission mode.

For example, if the same vehicle speed condition is used when determining the initiation of the pseudo-stepped downshift and when determining the cancellation of the pseudo-stepped downshift, if the same vehicle speed threshold is used, the pseudo-stepped downshift will be cancelled immediately after the pseudo-stepped downshift is initiated. In contrast, by setting the prescribed value B used for determining the cancellation of the pseudo-stepped downshift lower than the prescribed value A used for determining the initiation of the pseudo-stepped downshift, the pseudo-stepped downshift will not be canceled immediately after the pseudo-stepped downshift is initiated.

In the first embodiment, if, after the pseudo-stepped downshift is initiated, the mode cancellation condition is not satisfied and the condition to permit the pseudo-stepped downshift is not satisfied, the target primary rotational speed Npri* is set to the rotational speed that decreases as the vehicle speed VSP decreases at a decrease gradient used for the pseudo-stepped downshift. When the lower-limit target rotational speed Ntb is reached, a control to maintain the lower-limit target rotational speed Ntb is carried out.

For example, if, after the pseudo-stepped downshift is initiated, the condition to permit the pseudo-stepped downshift is not satisfied, the target primary rotational speed at that time is set as the lower-limit target rotational speed. In this case, if the rotational speed at the timing at which the permission condition is determined to be unsatisfied is between the downshift target rotational speed and the lower-limit target rotational speed, the target primary rotational speed (=engine rotational speed) falls to the lower-limit target rotational speed at once, thereby imparting discomfort to the driver. In contrast, when the condition to permit the pseudo-stepped downshift is not satisfied the target primary rotational speed Npri* at that time is set to the rotational speed that decreases as the vehicle speed VSP decreases at a decrease gradient used for the pseudo-stepped downshift. Accordingly, discomfort is not imparted to the driver regardless of the timing at which the condition to permit the pseudo-stepped downshift is determined to be unsatisfied.

In the first embodiment, in the pseudo-stepped downshift, the fixed transmission ratio line, in which the transmission ratio is maintained constant even when the vehicle speed VSP decreases, is set as the transient characteristic when there is a reduction from the downshift target rotational speed Nta to the lower-limit target rotational speed Ntb.

That is, the pseudo-stepped downshift combines the step-wise increase of the primary rotational speed Npri to the downshift target rotational speed Nta, and the decrease thereof from the downshift target rotational speed Nta to the lower-limit target rotational speed Ntb. By setting the transient characteristic when there is a decrease to the fixed transmission ratio line, the primary rotational speed Npri promptly decreases in accordance with the decrease in the vehicle speed VSP without imparting discomfort. Accordingly, the engine rotational speed region in which the engine output is high is maintained while ensuring a change in the engine rotational speed with which sluggishness in the engine rotational speed will not be felt, during execution of the pseudo-stepped downshift.

The effects are described next. The following effects can be obtained with the transmission control method and the transmission control device for a continuously variable transmission according to the first embodiment.

(1) An engine 1 and a continuously variable transmission (belt-type continuously variable transmission mechanism 4) connected to an input side of the engine 1 are provided. A control is performed while traveling to select a shifting mode from among a normal transmission mode for changing a transmission ratio in a stepless manner, and a pseudo-stepped transmission mode for changing the transmission ratio in a stepwise manner. This transmission control method for a continuously variable transmission has, as a pseudo-stepped transmission mode, a pseudo-stepped downshift mode, in which a transmission input rotational speed (primary rotational speed Npri) is increased to a downshift target rotational speed Nta in a stepwise manner, and then decreased toward a lower-limit target rotational speed Ntb as the vehicle speed VSP decreases. The downshift target rotational speed Nta and the lower-limit target rotational speed Ntb used for the pseudo-stepped downshift are set to values in an engine rotational speed region in which an engine output becomes greater than or equal to a prescribed value. When a mode transition condition is satisfied during deceleration by selecting the normal transmission mode, the mode is shifted to the pseudo-stepped downshift mode to start the pseudo-stepped downshift. When the pseudo-stepped downshift is initiated, an increase to the downshift target rotational speed Nta and a decrease to the lower-limit target rotational speed Ntb of the transmission input rotational speed (primary rotational speed Npri) are repeated, until a mode cancellation condition, including a re-acceleration request, is satisfied (FIG. 4). Accordingly, it is possible to provide a transmission control method for a continuously variable transmission that achieves an improvement in the acceleration response with respect to the re-acceleration request, while improving the feeling of deceleration during deceleration by selecting the pseudo-stepped downshift mode.

(2) The downshift target rotational speed Nta and the lower-limit target rotational speed Ntb are set to values in an engine rotational speed region corresponding to an engine output region C in which the maximum engine performance can be used, using an engine output characteristic indicating the relationship between the engine rotational speed and the engine output (FIG. 6). Accordingly, in addition to the effect of (1), it is possible to accelerate with good responsiveness from the maximum engine output region at the time of re-acceleration, when the pseudo-stepped downshift is canceled due to a re-acceleration request, thereby further improving the acceleration response.

(3) The downshift target rotational speed Nta and the lower-limit target rotational speed Ntb are set to a downshift target rotational speed Nt2 and a lower-limit target rotational speed Nt1 in a first engine rotational speed region CLow ahead of a maximum engine output D of the engine output characteristic, when normal travel is determined, and set to a downshift target rotational speed Nt4 and a lower-limit target rotational speed Nt3 in a second engine rotational speed region CHigh, including the maximum engine output D of the engine output characteristic, when sports travel is determined (FIG. 6). Accordingly, in addition to the effect of (2), by setting the downshift target rotational speed Nta and the lower-limit target rotational speed Ntb for each of the normal travel and the sports travel, it is possible to provide a vehicle performance in accordance with the driver's operation request, which improves drivability.

(4) The mode transition condition is satisfied when a vehicle deceleration becomes greater than or equal to a prescribed value during braking deceleration by a braking operation (YES in S2 of FIG. 4). Accordingly, in addition to the effects of (1)-(3), by the mode transitioning to the pseudo-stepped downshift mode when the vehicle deceleration becomes greater than or equal to the prescribed value at the time of the braking deceleration, the pseudo-stepped downshift that corresponds to the driver's deceleration request and deceleration intent can be executed.

(5) The mode transition condition is not satisfied when the vehicle deceleration is greater than or equal to the prescribed value and the vehicle speed VSP is less than the prescribed value (prescribed value A) at the time of the braking deceleration, and the selection of the normal transmission mode is maintained (S3→S7 in FIG. 4). Accordingly, in addition to the effect of (4), if the vehicle speed VSP is less than the prescribed value A, the pseudo-stepped downshift is not executed in the vehicle speed region in which the downshift is not required by maintaining the selection of the normal transmission mode, to thereby avoid the generation of shift shock.

(6) The mode transition condition is not satisfied when the vehicle deceleration is greater than or equal to the prescribed value and a lateral acceleration (lateral G) of the vehicle exceeds a prescribed value at the time of the braking deceleration, and the selection of the normal transmission mode is maintained (S5→S7 in FIG. 4). Accordingly, in addition to the effect of (4) or (5), by maintaining the selection of the normal transmission mode when the lateral G of the vehicle exceeds the prescribed value, changes in the driving force during turning are suppressed, and it is possible to ensure a smooth turning operation.

(7) The mode transition condition is not satisfied when the vehicle deceleration is greater than or equal to the prescribed value and the difference between the current target transmission input rotational speed (target primary rotational speed Npri*) and the downshift target rotational speed is less than a prescribed value at the time of the braking deceleration, and the selection of the normal transmission mode is maintained (S6→S7 in FIG. 4). Accordingly, in addition to the effects of (4)-(6), by not executing the pseudo-stepped downshift when the amount of increase for raising the current target primary rotational speed Npri* to the downshift target rotational speed is small, it is possible to avoid imparting discomfort to the driver caused by rotation hunting.

(8) In the mode transition condition, a first vehicle speed threshold (prescribed value A) is set as a vehicle speed condition with which to determine the initiation of the pseudo-stepped downshift. The mode cancellation condition is satisfied when the vehicle speed VSP becomes less than a second vehicle speed threshold (prescribed value B), which is a lower vehicle speed than the first vehicle speed threshold (prescribed value A) after initiating the pseudo-stepped downshift, and the mode transitions from the pseudo-stepped downshift mode to the normal transmission mode (S10→S12 in FIG. 4). Accordingly, in addition to the effects of (1)-(7), by setting the prescribed value B used for determining the cancellation of the pseudo-stepped downshift below the prescribed value A used for determining the initiation of the pseudo-stepped downshift, it is possible to prevent the pseudo-stepped downshift from being canceled immediately after the pseudo-stepped downshift is initiated.

Figure 10:
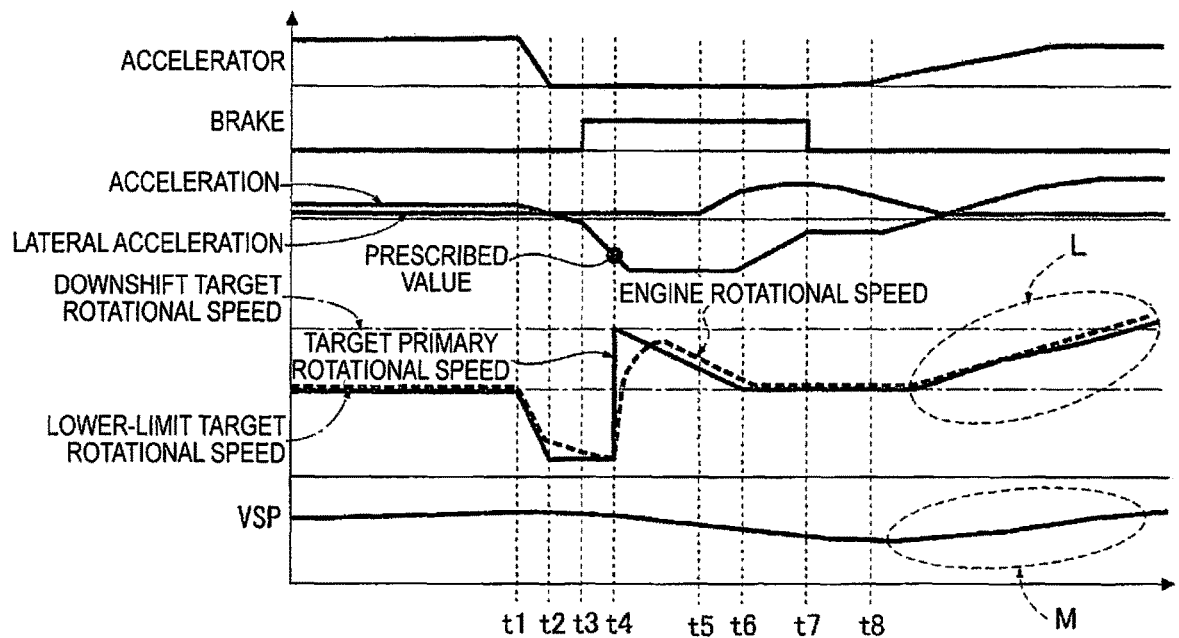
FIG. 10 is a time chart illustrating each characteristic in a case in which there is intervention by a driver operation when the pseudo-stepped downshift is executed during a braking deceleration according to the first embodiment.

(9) If, after the pseudo-stepped downshift is initiated, the mode cancellation condition is not satisfied and a condition to permit the pseudo-stepped downshift is not satisfied, the target transmission input rotational speed (target primary rotational speed Npri*) is set to a rotational speed that decreases as the vehicle speed VSP decreases at a decrease gradient used for the pseudo-stepped downshift, and when the lower-limit target rotational speed Ntb is reached, a control to maintain the lower-limit target rotational speed Ntb is carried out (FIG. 10). Accordingly, in addition to the effects of (1)-(8), it is possible to prevent imparting discomfort to the driver regardless of the timing at which the condition to permit the pseudo-stepped downshift is determined to be unsatisfied while executing the pseudo-stepped downshift.

(10) In the pseudo-stepped downshift, a fixed transmission ratio line, in which the transmission ratio is maintained constant even when the vehicle speed VSP decreases, is set as a transient characteristic when there is a reduction from the downshift target rotational speed Nta to the lower-limit target rotational speed Ntb (FIGS. 7, 8). Accordingly, in addition to the effects of (1)-(9), the engine rotational speed region in which the engine output is high is maintained while ensuring a change in the engine rotational speed with which sluggishness in the engine rotational speed will not be felt, when executing the pseudo-stepped downshift.

(11) An engine 1, a continuously variable transmission (belt-type continuously variable transmission mechanism 4) to an input side of which is connected the engine 1, and a transmission controller (CVT control unit 8) for carrying out a control while traveling to select a shifting mode from among a normal transmission mode for changing a transmission ratio in a stepless manner, and a pseudo-stepped transmission mode for changing the transmission ratio in a stepwise manner, are provided. In this transmission control device for a continuously variable transmission, the transmission controller (CVT control unit 8) has, as a pseudo-stepped transmission mode, a pseudo-stepped downshift mode, in which a transmission input rotational speed (primary rotational speed Npri) is increased to a downshift target rotational speed Nta in a stepwise manner, and then decreased toward a lower-limit target rotational speed Ntb as the vehicle speed VSP decreases. The downshift target rotational speed Nta and the lower-limit target rotational speed Ntb used for the pseudo-stepped downshift are set to values in an engine rotational speed region in which an engine output becomes greater than or equal to a prescribed value. When a mode transition condition is satisfied during deceleration by selecting the normal transmission mode, the mode is shifted to the pseudo-stepped downshift mode to start the pseudo-stepped downshift. When the pseudo-stepped downshift is initiated, an increase to the downshift target rotational speed Nta and a decrease to the lower-limit target rotational speed Ntb of the transmission input rotational speed (primary rotational speed Npri) are repeated, until a mode cancellation condition, including a re-acceleration request, is satisfied (FIG. 4). Accordingly, it is possible to provide a transmission control device for a continuously variable transmission that achieves an improvement in the acceleration response with respect to the re-acceleration request, while improving the feeling of deceleration during deceleration by selecting the pseudo-stepped downshift mode.

Second Embodiment

The second embodiment is an example in which the transient characteristic for a reduction from the downshift target rotational speed to the lower-limit target rotational speed in the pseudo-stepped downshift is different from the first embodiment.

The configuration is described first. Of the configuration of the second embodiment, the "overall system configuration" and the "configuration of a process for setting a target rotational speed used in the pseudo-stepped downshift" are the same as in the first embodiment; thus, illustrations and descriptions regarding FIGS. 1-3 and 5 will be omitted. The "configuration of the mode transition control process" of the second embodiment will be described below.

Configuration of the Mode Transition Control Process

Figure 11:
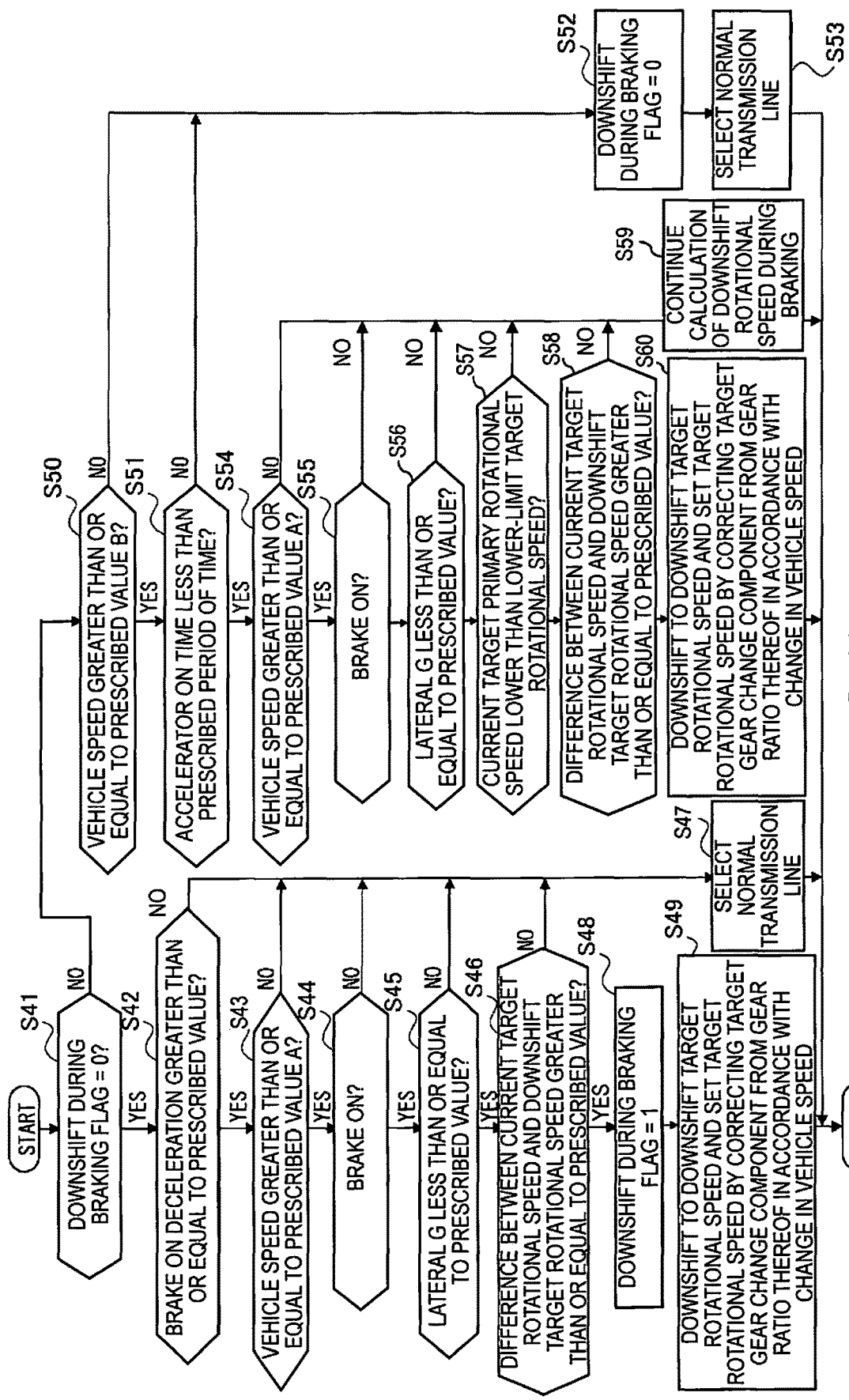
FIG. 11 is a flow chart illustrating a flow of the mode transition control process between the normal transmission mode and the pseudo-stepped downshift mode in the shift control executed in the CVT control unit according to a second embodiment.

FIG. 11 is a flow chart illustrating a flow of the mode transition control process between the normal transmission mode and the pseudo-stepped downshift mode in the shift control executed in the CVT control unit 8 according to the second embodiment. Each step in FIG. 11, which shows the configuration of the mode transition control process, will be described below.

S41 to S48 respectively correspond to Steps S1 to S8 in FIG. 4. In addition, Steps S50 to S58 respectively correspond to Steps S10 to S18 in FIG. 4. Therefore, the description of these steps is omitted.

In Step S49, following the overwriting of downshift during braking flag=1 in Step S48, the primary rotational speed Npri at that time is increased to the downshift target rotational speed in a stepwise manner in order to downshift. When the primary rotational speed Npri reaches the downshift target rotational speed, the target rotational speed is set by correcting the target gear change component from the gear ratio thereof in accordance with the change in the vehicle speed, and the process proceeds to RETURN.

Here, the "downshift target rotational speed" is the value determined through the setting process of FIG. 5 of the first embodiment. The "target rotational speed is set by correcting the target gear change component from the gear ratio thereof in accordance with the change in the vehicle speed" means to generate the target rotational speed by correcting the "change in the transmission ratio" component with respect to the gear ratio of the downshift target rotational speed. In other words, it means setting the target primary rotational speed Ppri* to a rotational speed that decreases as the vehicle speed VSP decreases along a preset downshift line, when there is a reduction from the downshift target rotational speed to the lower-limit target rotational speed.

Figure 12:
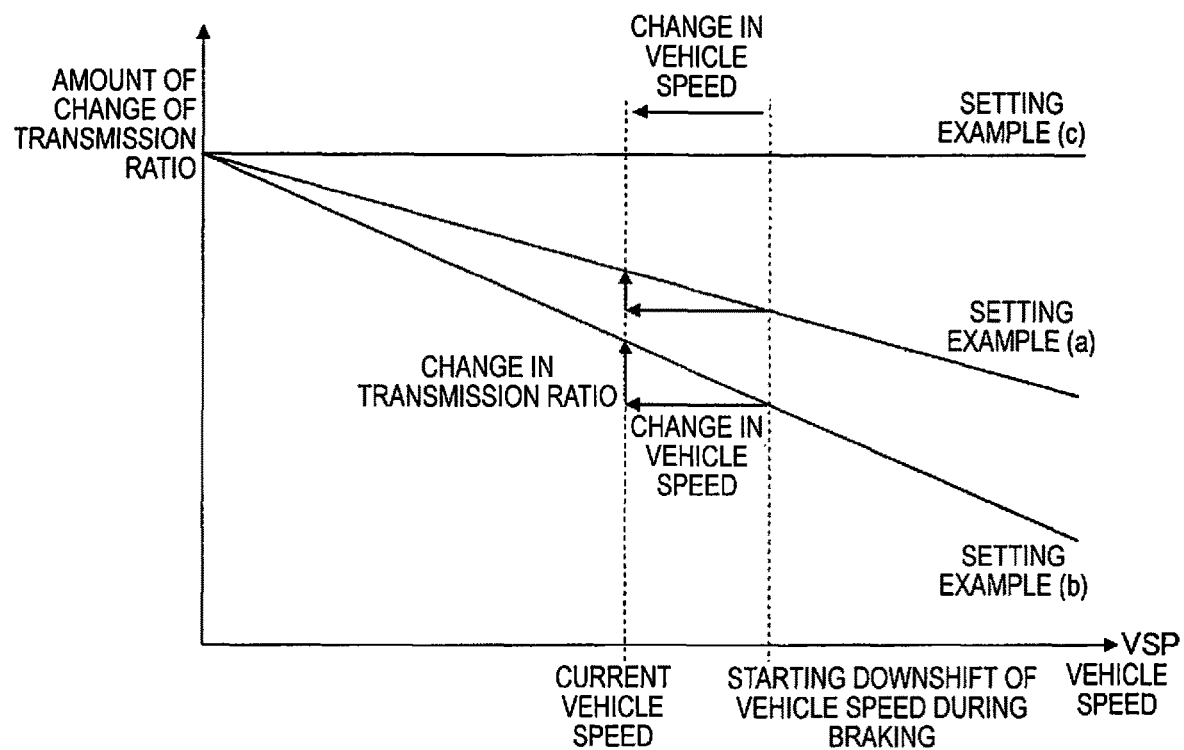
FIG. 12 is an explanatory view illustrating how to determine a downshift line when a target primary rotational speed is decreased from the downshift target rotational speed to the lower-limit target rotational speed in the pseudo-stepped downshift according to the second embodiment.

A downshift line that is set in the second embodiment to a decrease gradient that is gentler than the fixed transmission ratio line and that is steeper than a gradient at which a rotation sluggishness will be felt, shall be setting example (a). In contrast, a downshift line in which the amount of change of the transmission ratio is greater than the second embodiment shall be setting example (b), and the fixed transmission ratio line of the first embodiment shall be setting example (c). At this time, the amount of change of the transmission ratio is smaller for setting example (a) than setting example (b), as illustrated in FIG. 12; thus, the change in the target rotational speed with respect to the change in the vehicle speed will be greater for setting example (a) than setting example (b).

In Step S59, following a NO (not established) determination in any of the Steps S54, S55, S56, S57, S58, which are conditions to permit the pseudo-stepped downshift mode, calculation of the current downshift rotational speed during braking is continued, and the process proceeds to RETURN. Here, "continuing the calculation of the current downshift rotational speed during braking" means setting the target primary rotational speed Npri* to a rotational speed that decreases together with the vehicle speed VSP at a decrease gradient (downshift gradient that takes into account rotation sluggishness and frequent shifting in the case of the second embodiment) that is used in the pseudo-stepped downshift, and maintaining the lower-limit target rotational speed after reaching the lower-limit target rotational speed.

In Step S60, following a YES (established) determination in all of the Steps S54, S55, S56, S57, S58, which are conditions to permit the pseudo-stepped downshift mode, the primary rotational speed Npri at that time is increased in a stepwise manner to the downshift target rotational speed in order to downshift. Then, when the primary rotational speed Npri reaches the downshift target rotational speed, the target rotational speed is set by correcting the target gear change component from the gear ratio thereof in accordance with the change in the vehicle speed, and the process proceeds to RETURN.

Here, the "downshift target rotational speed" is the value determined through the setting process of FIG. 5 of the first embodiment. The "target rotational speed is set by correcting the target gear change component from the gear ratio thereof in accordance with the change in the vehicle speed" means, in the same manner as in Step S49, to set the target primary rotational speed Ppri* to a rotational speed that decreases as the vehicle speed VSP decreases along the preset downshift line, when there is a reduction from the downshift target rotational speed to the lower-limit target rotational speed.

The actions are described next. In the second embodiment, in the pseudo-stepped downshift, a downshift line, with a decrease gradient that is gentler than the fixed transmission ratio line and that is steeper than the gradient at which a rotation sluggishness will be felt, is set as the transient characteristic when there is a reduction from the downshift target rotational speed Nta to the lower-limit target rotational speed Ntb.

Figure 13:
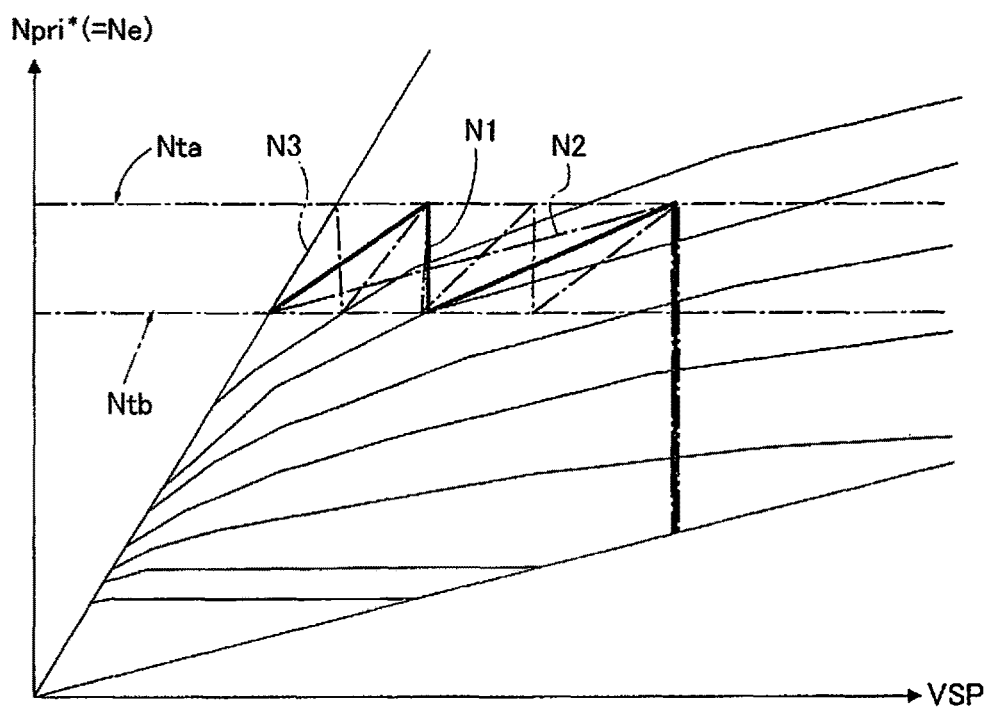
FIG. 13 is a pseudo-stepped downshift characteristic diagram illustrating the states in which the target primary rotational speed changes on the shift schedule when the pseudo-stepped downshift is executed according to the second embodiment.

That is, a downshift line N1 in the second embodiment has a decrease gradient that is gentler than the fixed transmission ratio line N3 and that is steeper than a downshift line N2 with a gradient at which a rotation sluggishness will be felt, as illustrated in FIG. 13. Accordingly, by setting the transient characteristic when lowering the target primary rotational speed Npri* in the pseudo-stepped downshift to the downshift line N1, frequent shifting will not be felt as much as with the fixed transmission ratio line N3, and rotation sluggishness of the primary rotational speed Npri (=engine rotational speed) will not be felt as much as with the downshift line N2. Therefore, the engine rotational speed region in which the engine output is high is maintained, without feeling sluggishness in the engine rotational speed or feeling frequent shifting, when executing the pseudo-stepped downshift.

The effects are described next. The following effects can be obtained with the transmission control method and the transmission control device for a continuously variable transmission according to the second embodiment.

(12) In the pseudo-stepped downshift, a downshift line N1, with a decrease gradient that is gentler than the fixed transmission ratio line and that is steeper than a gradient at which a rotation sluggishness will be felt, is set as the transient characteristic when there is a reduction from the downshift target rotational speed Nta to the lower-limit target rotational speed Ntb (FIG. 13). Accordingly, in addition to the effects of (1) to (9) and (11), the engine rotational speed region in which the engine output is high is maintained without feeling sluggishness in the engine rotational speed or feeling frequent shifting, when executing the pseudo-stepped downshift.

The transmission control method and the transmission control device for a continuously variable transmission according to the present invention have been described above based on the first and second embodiments. However, specific configurations are not limited to these embodiments and various modifications and additions to the design can be made without departing from the scope of the invention according to each claim in the Claims.

In the first and second embodiments, an example was shown in which two sets of the downshift target rotational speed Nta and the lower-limit target rotational speed Ntb are respectively set for normal travel and sports travel. However, just one set of the downshift target rotational speed and the lower-limit target rotational speed may be set as well. In addition, a plurality of sets of three or more, which can be selected according to the traveling scenario, may be set as well.

In the first embodiment, an example was shown in which the fixed transmission ratio line, in which the transmission ratio is held constant even when the vehicle speed VSP decreases, is set as the transient characteristic when there is a reduction from the downshift target rotational speed Nta to the lower-limit target rotational speed Ntb in the pseudo-stepped downshift. In the second embodiment, an example was shown in which a downshift line N1, with a decrease gradient that is gentler than the fixed transmission ratio line and that is steeper than a gradient at which a rotation sluggishness will be felt, is set as the transient characteristic. However, a plurality of characteristic lines may be set in advance, and the transient characteristic may be selected from the plurality of lines in accordance with the driver's selection or the driver's operation situation.

In the first and second embodiments, an example was shown in which the transmission control method and the transmission control device for a continuously variable transmission according to the present invention are applied to an engine-powered vehicle. However, the transmission control method and the transmission control device for a continuously variable transmission according to the present invention are not limited to engine-powered vehicles and may be applied to electrically driven vehicles such as hybrid vehicles. In addition, the continuously variable transmission is not limited to the belt-type continuously variable transmission and may be another type of continuously variable transmissions, such as a toroidal type continuously variable transmission. In short, the present invention can be applied to a vehicle equipped with a continuously variable transmission, to the input side of which an engine is connected.

The invention claimed is:

1. A transmission control method for a continuously variable transmission connected to an input side of an engine, the transmission control method comprising:

performing a control while traveling to select a shifting mode from among a normal transmission mode for changing a transmission ratio in a stepless manner, and a pseudo-stepped transmission mode for changing the transmission ratio in a stepwise manner, the pseudo-stepped transmission mode having a pseudo-stepped downshift mode in which a transmission input rotational speed is increased to a downshift target rotational speed in a stepwise manner, and then decreased toward a lower-limit target rotational speed as the vehicle speed decreases;

setting the downshift target rotational speed and the lower-limit target rotational speed used for the pseudo-stepped downshift to values in an engine rotational speed region in which an engine output becomes greater than or equal to a prescribed value;

shifting to the pseudo-stepped downshift mode to start the pseudo-stepped downshift when a mode transition condition is satisfied during deceleration by selecting the normal transmission mode; and repeating an increase to the downshift target rotational speed and a decrease to the lower-limit target rotational speed of the transmission input rotational speed when the pseudo-stepped downshift is initiated, until a mode cancellation condition, including a re-acceleration request, is satisfied.

2. The transmission control method according to claim 1, wherein
the setting of the downshift target rotational speed and the lower-limit target rotational speed are set to values in an engine rotational speed region corresponding to an engine output region in which a maximum engine performance can be used, using an engine output characteristic indicating a relationship between an engine rotational speed and an engine output.

3. The transmission control method according to claim 2, wherein
the setting of the downshift target rotational speed and the lower-limit target rotational speed are set to a downshift target rotational speed and a lower-limit target rotational speed in a first engine rotational speed region ahead of a maximum engine output of the engine output characteristic, when normal travel is determined, and set to a downshift target rotational speed and a lower-limit target rotational speed in a second engine rotational speed region, including the maximum engine output of the engine output characteristic, when sports travel is determined.

4. The transmission control method according to claim 1, further comprising
determining the mode transition condition is satisfied when a vehicle deceleration becomes greater than or equal to a prescribed value during braking deceleration by a braking operation.

5. The transmission control method according to claim 4, further comprising
determining the mode transition condition is not satisfied when the vehicle deceleration is greater than or equal to the prescribed value and the vehicle speed is less than a prescribed value at the time of the braking deceleration, and selection of the normal transmission mode is maintained.

6. The transmission control method according to claim 4, further comprising
determining the mode transition condition is not satisfied when the vehicle deceleration is greater than or equal to the prescribed value and a lateral acceleration of the vehicle exceeds a prescribed value at the time of the braking deceleration, and selection of the normal transmission mode is maintained.

7. The transmission control method according to claim 4, further comprising
determining the mode transition condition is not satisfied when the vehicle deceleration is greater than or equal to the prescribed value and the difference between a current target transmission input rotational speed and the downshift target rotational speed is less than a prescribed value at the time of the braking deceleration, and selection of the normal transmission mode is maintained.

8. The transmission control method according to claim 1, further comprising
setting a first vehicle speed threshold as a vehicle speed condition for determining an initiation of the pseudo-stepped downshift while in the mode transition condition, and
determining the mode cancellation condition is satisfied when the vehicle speed becomes less than a second vehicle speed threshold, which is a lower vehicle speed than the first vehicle speed threshold after initiating the pseudo-stepped downshift, and the mode transitions from the pseudo-stepped downshift mode to the normal transmission mode.

9. The transmission control method according to claim 1, further comprising
setting the target transmission input rotational speed to a rotational speed that decreases as the vehicle speed decreases at a decrease gradient used for the pseudo-stepped downshift when the mode cancellation condition is not satisfied after the pseudo-stepped downshift is initiated and a condition to permit the pseudo-stepped downshift is not satisfied, and performing a control to maintain the lower-limit target rotational speed when the lower-limit target rotational speed is reached.

10. The transmission control method according to claim 1, further comprising
setting a fixed transmission ratio line, in which the transmission ratio is maintained constant even when a vehicle speed decreases as a transient characteristic when the downshift target rotational speed is reduced to the lower-limit target rotational speed in the pseudo-stepped downshift.

11. The transmission control method according to claim 1, wherein
setting a downshift line, which has a decrease gradient that is gentler than a fixed transmission ratio line and that is steeper than a gradient at which a rotation sluggishness will be felt, as the transient characteristic when the downshift target rotational speed is reduced to the lower-limit target rotational speed in the pseudo-stepped downshift.

12. A transmission control device for a continuously variable transmission, the transmission control device comprising:
an engine;
a continuously variable transmission connected to an input side of the engine; and
a transmission controller configured to perform a control while traveling to select a shifting mode from among a normal transmission mode for changing a transmission ratio in a stepless manner, and a pseudo-stepped transmission mode for changing the transmission ratio in a stepwise manner;

the transmission controller including:

a pseudo-stepped downshift mode as the pseudo-stepped transmission mode, in which a transmission input rotational speed is increased to a downshift target rotational speed in a stepwise manner, and then decreased toward a lower-limit target rotational speed as a vehicle speed decreases;

setting the downshift target rotational speed and the lower-limit target rotational speed used for the pseudo-stepped downshift to values in an engine rotational speed region in which an engine output becomes greater than or equal to a prescribed value;

shifting to the pseudo-stepped downshift mode to start the pseudo-stepped downshift when a mode transition condition is satisfied during deceleration by selecting the normal transmission mode; and executing a process for repeating an increase to the downshift target rotational speed and a decrease to the lower-limit target rotational speed of the transmission input rotational speed, when the pseudo-stepped downshift is initiated, until a mode cancellation condition, including a re-acceleration request, is satisfied.

* * * * *